(12) United States Patent
Hankinson et al.

(10) Patent No.: US 10,894,737 B2
(45) Date of Patent: Jan. 19, 2021

(54) APPARATUS AND METHOD FOR FORMING MELT-FORMED INORGANIC FIBRES

(71) Applicant: Thermal Ceramics UK Limited, Merseyside (GB)

(72) Inventors: Michael Hankinson, Merseyside (GB); Gary Jubb, Merseyside (GB)

(73) Assignee: Thermal Ceramics UK Limited, Wirral (GB)

( * ) Notice: Subject to any disclaimer, the term of this patent is extended or adjusted under 35 U.S.C. 154(b) by 0 days.

(21) Appl. No.: 16/069,669

(22) PCT Filed: Jan. 11, 2017

(86) PCT No.: PCT/EP2017/050506
§ 371 (c)(1),
(2) Date: Jul. 12, 2018

(87) PCT Pub. No.: WO2017/121770
PCT Pub. Date: Jul. 20, 2017

(65) Prior Publication Data
US 2019/0023604 A1    Jan. 24, 2019

(30) Foreign Application Priority Data

Jan. 15, 2016 (GB) .................................. 1600775.9
Aug. 4, 2016 (EP) .................................. 16182735

(51) Int. Cl.
*C03B 37/05* (2006.01)
*D04H 1/4226* (2012.01)
(Continued)

(52) U.S. Cl.
CPC ............ *C03B 37/055* (2013.01); *C03C 3/078* (2013.01); *C03C 3/087* (2013.01); *C03C 4/0014* (2013.01);
(Continued)

(58) Field of Classification Search
CPC .......... C03B 37/055; D01D 7/00; D01D 5/08; C04B 35/657; C04B 35/62245;
(Continued)

(56) References Cited

U.S. PATENT DOCUMENTS 2,561,843 A    7/1951 Coleman
2,646,593 A    7/1953 Downey
(Continued)

FOREIGN PATENT DOCUMENTS

DE    3427918 A1    1/1986
EP    2634308 A1    9/2013
(Continued)

OTHER PUBLICATIONS

PCT International Preliminary Report on Patentability in PCT/EP2017/050506 dated Jul. 17, 2018, 13 pages.
(Continued)

*Primary Examiner* — David Sample
*Assistant Examiner* — Donald M Flores, Jr.
(74) *Attorney, Agent, or Firm* — Servilla Whitney LLC

(57) ABSTRACT

Apparatus and methods for forming melt-formed fibres and melt-formed biosoluble fibers are disclosed. The apparatus comprises a spinning head comprising one or more rotors; a plurality of nozzles or slots disposed around at least part of the one or more rotors; a conveyor; and a barrier between the spinning head and the conveyor.

13 Claims, 12 Drawing Sheets

(51) Int. Cl.
*D04H 1/46* (2012.01)
*D01D 5/08* (2006.01)
*D01D 7/00* (2006.01)
*C03C 13/00* (2006.01)
*C03C 3/078* (2006.01)
*C03C 3/087* (2006.01)
*C03C 4/00* (2006.01)
*C04B 35/622* (2006.01)
*C04B 35/657* (2006.01)
*D04H 1/4209* (2012.01)
*C03C 13/06* (2006.01)
*C04B 35/653* (2006.01)

(52) U.S. Cl.
CPC ............ *C03C 13/00* (2013.01); *C03C 13/006* (2013.01); *C03C 13/06* (2013.01); *C04B 35/224* (2013.01); *C04B 35/62231* (2013.01); *C04B 35/62245* (2013.01); *C04B 35/62263* (2013.01); *C04B 35/653* (2013.01); *C04B 35/657* (2013.01); *D01D 5/08* (2013.01); *D01D 7/00* (2013.01); *D04H 1/4209* (2013.01); *D04H 1/4226* (2013.01); *D04H 1/46* (2013.01); *C03C 2204/00* (2013.01); *C03C 2213/02* (2013.01); *C04B 2235/3201* (2013.01); *C04B 2235/3206* (2013.01); *C04B 2235/3208* (2013.01); *C04B 2235/3213* (2013.01); *C04B 2235/3217* (2013.01); *C04B 2235/3244* (2013.01); *C04B 2235/3418* (2013.01); *C04B 2235/5264* (2013.01); *C04B 2235/96* (2013.01); *D10B 2101/06* (2013.01); *D10B 2101/08* (2013.01); *D10B 2401/024* (2013.01); *Y10T 428/249921* (2015.04); *Y10T 428/26* (2015.01)

(58) Field of Classification Search
CPC ........ C04B 2235/96; C04B 2235/3418; C04B 2235/3217; C04B 2235/5264; C04B 2235/3244; C04B 2235/3213; C04B 2235/3208; C04B 2235/3206; C04B 2235/3201; C04B 35/195; C04B 35/19; C03C 13/006; C03C 13/00; C03C 4/0014; C03C 3/087; C03C 3/078; C03C 2213/02; C03C 2204/00; C03C 13/06; D04H 1/46; D04H 1/4209; D04H 1/4226; Y10T 428/26; Y10T 428/249921; D10B 2401/024; D10B 2101/08; D10B 2101/06
See application file for complete search history.

(56) References Cited

U.S. PATENT DOCUMENTS

| | | | |
|---|---|---|---|
| 4,238,213 A | 12/1980 | Pallo et al. | |
| 4,504,957 A | 3/1985 | McClelland | |
| 4,578,918 A | 4/1986 | Yost et al. | |
| 4,690,690 A | 9/1987 | Andrew et al. | |
| 5,332,698 A * | 7/1994 | Nyssen | C03C 3/078 501/35 |
| 5,332,699 A * | 7/1994 | Olds | C03C 13/00 501/36 |
| 6,726,884 B1 | 4/2004 | Dillon et al. | |
| 8,182,751 B2 | 5/2012 | Shirk et al. | |
| 2010/0055004 A1 | 3/2010 | Olson et al. | |
| 2011/0259241 A1 | 10/2011 | Sugiura et al. | |
| 2012/0100983 A1 | 4/2012 | Yonaiyama et al. | |
| 2012/0168665 A1 | 7/2012 | Kitahara et al. | |
| 2012/0247156 A1 | 10/2012 | Kitahara et al. | |
| 2012/0247695 A1 | 10/2012 | Mihara et al. | |
| 2012/0248367 A1 | 10/2012 | Kishiki et al. | |
| 2012/0252295 A1 | 10/2012 | Ishihara et al. | |
| 2013/0090224 A1 | 4/2013 | Iwata et al. | |
| 2013/0225391 A1 | 8/2013 | Iwata et al. | |
| 2014/0342115 A1 | 11/2014 | Sakane et al. | |
| 2015/0144830 A1 | 5/2015 | Iwata et al. | |
| 2015/0175477 A1 * | 6/2015 | Zhao | G10K 11/162 428/221 |

FOREIGN PATENT DOCUMENTS

| | | | | |
|---|---|---|---|---|
| EP | 2765380 A2 | 8/2014 | | |
| EP | 2796597 A1 * | 10/2014 | ............... | D01F 9/08 |
| EP | 2796597 A1 | 10/2014 | | |
| EP | 3026029 A1 | 6/2016 | | |
| EP | 3026029 A1 * | 6/2016 | ....... | C04B 35/62245 |
| GB | 867299 A | 5/1961 | | |
| JP | 5616578 B2 | 10/2014 | | |
| WO | 92/12939 A1 | 8/1992 | | |
| WO | 96/38391 A1 | 12/1996 | | |
| WO | 01/23314 A1 | 4/2001 | | |
| WO | 2006/004974 A2 | 1/2006 | | |
| WO | 2006/128955 A3 | 12/2006 | | |
| WO | 2007/143067 A2 | 12/2007 | | |
| WO | 2008/136875 A1 | 11/2008 | | |
| WO | 2009/032147 A2 | 3/2009 | | |
| WO | 2009/032191 A1 | 3/2009 | | |
| WO | 2009/126593 A2 | 10/2009 | | |
| WO | 2010/024920 A1 | 3/2010 | | |
| WO | 2010/074711 A2 | 7/2010 | | |
| WO | 2010/077360 A2 | 7/2010 | | |
| WO | 2010/120380 A2 | 10/2010 | | |
| WO | 2010/122337 A1 | 10/2010 | | |
| WO | 2011/019377 A2 | 2/2011 | | |
| WO | 2011/019394 A1 | 2/2011 | | |
| WO | 2011/019396 A2 | 2/2011 | | |
| WO | 2011/037617 A1 | 3/2011 | | |
| WO | 2011/037634 A1 | 3/2011 | | |
| WO | 2011/040968 A2 | 4/2011 | | |
| WO | 2011/060259 A1 | 5/2011 | | |
| WO | 2011/060421 A1 | 5/2011 | | |
| WO | 2011/067598 A1 | 6/2011 | | |
| WO | 2011/083695 A1 | 7/2011 | | |
| WO | 2011/083696 A1 | 7/2011 | | |
| WO | 2011/084475 A1 | 7/2011 | | |
| WO | 2011/084487 A1 | 7/2011 | | |
| WO | 2011/084558 A1 | 7/2011 | | |
| WO | 2011/133778 A2 | 10/2011 | | |
| WO | 2012/021270 A2 | 2/2012 | | |
| WO | 2012/021817 A2 | 2/2012 | | |
| WO | 2012/049858 A1 | 4/2012 | | |
| WO | 2012/065052 A1 | 5/2012 | | |
| WO | 2012/068427 A2 | 5/2012 | | |
| WO | 2012/132271 A1 | 10/2012 | | |
| WO | 2012/132327 A1 | 10/2012 | | |
| WO | 2012/132329 A1 | 10/2012 | | |
| WO | 2012/132469 A1 | 10/2012 | | |
| WO | 2012/148468 A1 | 11/2012 | | |
| WO | 2012/148469 A1 | 11/2012 | | |
| WO | 2013/015083 A1 | 1/2013 | | |
| WO | 2013/046052 A2 | 4/2013 | | |
| WO | 2013/060456 A1 | 6/2013 | | |
| WO | 2013/080455 A1 | 6/2013 | | |
| WO | 2015/011930 A1 | 1/2015 | | |
| WO | 2015/055758 A1 | 4/2015 | | |
| WO | 2015/142294 A1 | 9/2015 | | |

OTHER PUBLICATIONS

PCT International Search Report in PCT/EP2017/050506 dated Jun. 21, 2017, 8 pages.

PCT international Written Opinion in PCT/EP2017/050506 dated Jun. 21, 2017, 12 pages.

* cited by examiner

Fig. 8
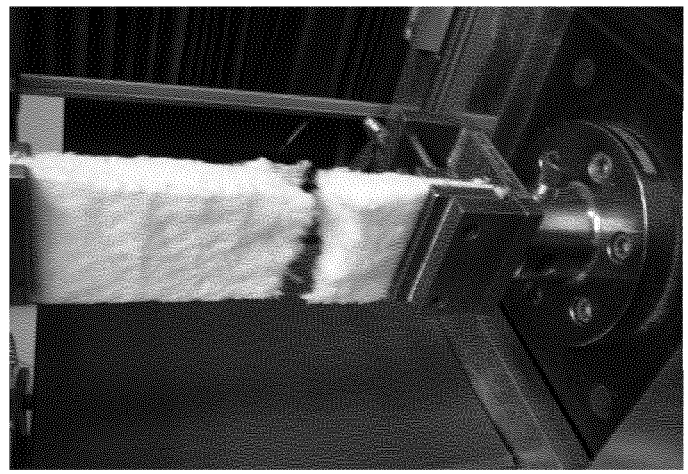
Sample after test
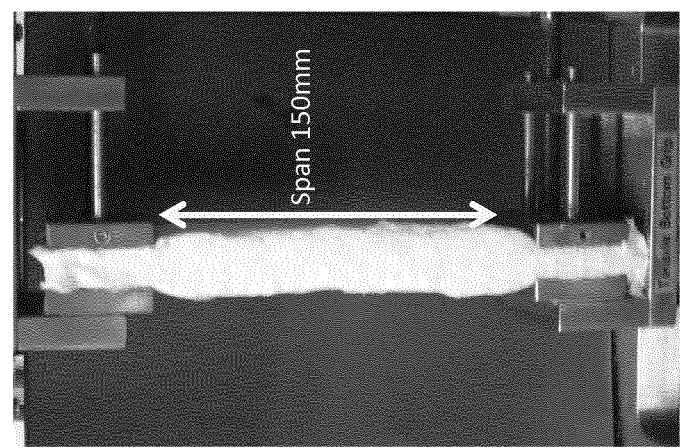
Sample before test

APPARATUS AND METHOD FOR FORMING MELT-FORMED INORGANIC FIBRES

CROSS REFERENCE TO RELATED APPLICATIONS

This is a National Phase entry of International Application No. PCT/EP2017/050506, filed Jan. 11, 2017, which claims priority to Great Britain Patent Application No. 1600775.9, filed Jan. 15, 2016, and to European Patent Application No. 16182735.7, filed Aug. 4, 2016, the disclosures of which are incorporated herein by reference in their entireties.

FIELD OF THE INVENTION

This invention relates to apparatus and methods for producing inorganic fibres, inorganic fibres (in particular, although not exclusively, glassy fibres comprising oxides as their only or principal constituent), and blankets made from such fibres.

BACKGROUND

Inorganic Fibres

Inorganic fibrous materials are well known for their use as thermal and/or acoustic insulating materials and are also known for their use as strengthening constituents in composite materials such as, for example, fibre reinforced cements, fibre reinforced plastics, and as a component of metal matrix composites. Such fibres may be used in support structures for catalyst bodies in pollution control devices such as automotive exhaust system catalytic converters and diesel particulate filters and may be used in the catalyst bodies themselves. Such fibres may be used as a constituent of friction materials [e.g. for automotive brakes].

Inorganic fibres for use in insulation are well known. A convenient means of providing insulation from inorganic fibres is as blankets comprising said fibres. Since these blankets are to be used as thermal insulation, it is imperative that their thermal conductivity be as low as possible.

In addition, in many applications it is preferable for the blanket to have a low density. For example, in vehicles the lower the density (and thus mass) of thermal insulation carried, the less of a burden the thermal insulation is, and so the vehicle's performance is correspondingly increased.

There is therefore always a need to produce inorganic fibres which, when made into blankets, attain lower thermal conductivities at a given density than previously achieved.

Thermal Conductivity of Bodies of Inorganic Fibres

Thermal conductivity of a body of melt formed fibres (e.g. a blanket or other product form) is determined by a number of factors including in particular: —

Diameter of the fibres; and
"Shot" (unfiberised material) content.

Fine diameter fibres provide low thermal conductivity to a body of fibres by reducing the scope for conduction through the solid and permitting finer inter-fibre porosity increasing the number of radiate-absorb steps for heat to pass by radiation from one side of the body to the other.

The presence of shot in a blanket increases thermal conductivity of the blanket by increasing the scope for conduction through the solid. Shot also increases the density of a blanket. The lower the shot content, the lower the thermal conductivity and density. For two bodies of identical fibre content and chemistry, the body with the lower shot content will have both the lower density and lower thermal conductivity.

Manufacturing Processes for Inorganic Fibres

Inorganic fibres can be made by a variety of routes. Prior to 1987 there were four principle types of fibrous materials used for making thermal insulation products [such as, for example, blanket, vacuum formed shapes, and mastics]. These were made by two principal manufacturing routes, although the details of the particular routes vary according to manufacturer. The fibres and routes were (in order of increasing cost and temperature performance): —

Melt formed fibres
Glass wools
Mineral wools
Aluminosilicate fibres
Sol-gel process fibres
So-called polycrystalline fibres Sol-gel process fibres tend to be more expensive than melt formed fibres as they are significantly more complex to make. The present disclosure does not relate to sol-gel process fibres but to melt formed fibres.

Because of the history of asbestos fibres, a lot of attention has been paid to the relative potency of a wide range of fibre types as a cause of lung disease. Studies of the toxicology of natural and man-made fibres led to the idea that it was the persistence of fibres in the lung that caused problems. Accordingly, the view developed that if fibres can be removed from the lung quickly, then any risk to health would be minimised.

The concepts of "biopersistent fibres" and "biopersistence" arose—fibres that last for a long time in the animal body are considered biopersistent and the relative time that fibres remain in the animal body is known as biopersistence. Whilst several glass systems were known to be soluble in lung fluids, resulting in low biopersistence, there was a problem in that such glass systems were generally not useful for high temperature applications. A market need was seen for a fibre that could have a low biopersistence combined with a high temperature capability.

In 1987 Johns Manville developed such a system based on a calcium magnesium silicate chemistry. Such material not only had a higher temperature capability than traditional glass wools, but also had a higher solubility in body fluids than the aluminosilicate fibres mostly used for high temperature insulation. Such low biopersistent fibres have been developed since, and a range of alkaline earth silicate [AES] fibres are now on the market including magnesium silicates, calcium silicates, and calcium magnesium silicates.

Other fibres that have been developed in recent years include alkali metal aluminosilicate fibres.

Melt formed fibres can be made by a variety of routes, but for refractory melt formed fibres the principal routes are by blowing or by spinning.

In both methods a melt of desired composition is formed and a stream of the molten material (commonly called the "tap stream") is disrupted and accelerated to form fibres (and undesired shot).

In blowing, disruption is by a jet of high pressure air or other gas that breaks up the tap stream.

In spinning disruption is by one or more high-speed rotors (with or without blowing air around the rotor), such that fibres are flung off the rotors and collected for subsequent processing. A rotor may, for example, be a wheel or a drum, and may have a cylindrical, conical, or otherwise profiled periphery and it is commonplace to provide multiple rotors.

In blowing, disruption of the tap stream takes a very short time (e.g. 2 ms) which results in relatively uniform fiberisation. In spinning, disruption of the tap stream takes a longer time (e.g. 10 ms) during which the melt loses heat to the rotors.

The result of these different forming processes is that generally, for a given chemistry, for a mass of fibres as formed during fiberisation and before any processing: —
- blown fibres have a higher proportion of fine fibres than spun;
- blown fibres have a narrower spectrum of fibre diameter than spun fibres;
- blown fibres have a higher amount of shot than spun fibres;
- blown fibres are shorter on average than spun fibres.

For an aluminosilicate fibre (52-58% $SiO_2$; 42-48% $Al_2O_3$; <2% others—RCF), FIG. 6 shows a fibre diameter distribution for blown and spun materials showing blown material having the bulk of the fibres clustered around 1 μm diameter and the spun fibres having a much broader distribution. The thermal conductivity at 1000° C. of a 128 $kg·m^{-3}$ blanket for spun material was around 0.34 $W·m^{-1}·K^{-1}$ whereas for blown material it was around 0.30 $W·m^{-1}·K^{-1}$ showing the beneficial effect of the finer diameter fibre distribution of blown fibre, despite more shot.

Typical fibre length ranges for blown RCF fibres lie in the range up to 10 cm, and for spun fibres 1-50 cm. Typically in the spinning process long plumes of fibre are seen with the plumes being up to a meter long Because of the nature of the molten material, alkaline earth silicate fibres are not blown since extremely low fibre yields and high shot contents are obtained.

Fibre lengths are difficult to measure and so generally proxies for fibre length are used such as a "beaker value" [which looks at settling behaviour in a liquid] or by making blanket and measuring tensile strength.

Typically, when making blankets, the fibres are collected on a conveyor to form a mass of fibres carrying any shot present (a "fleece"), and are then, while travelling on the conveyor, "needled" to entangle the fibres to produce a blanket held together by the entangled fibres. Other methods of producing entanglement are known [for example by using fine water jets] and the present invention is not limited to use of needling.

A spinning apparatus is described in WO92/12939 and WO2015/055758 comprising
- a source of molten material;
- a spinning head comprising one or more rotors each having an axis of rotation, the spinning head being configured to receive molten material from the source of molten material;
- a plurality of nozzles disposed around at least part of the one or more rotors, configured to supply a stream of gas;
- a conveyor disposed to receive fibres produced from the molten material.

In that apparatus, the fibre produced discharges straight onto a conveyor, and below the spinning head is a pit into which shot ("pearls") and some fibre falls and is removed for recirculation.

In WO2015/055758 the spinning head comprises rotors providing accelerations at their periphery in the range 20-400 $km·s^{-2}$, and the stream of gas has a velocity of 100-300 $m·s^{-1}$.

U.S. Pat. No. 4,238,213 disclosed that use of high spinning speeds favours formation of finer fibres from a spinning process. US2012/247156 indicates that forming alkaline earth silicate fibres with over 70% silica is a problem due to an increase in viscosity of the raw material so that fine fibres (<5 μm) are not obtainable, and that using a high speed rotor, with a stable supply of molten material, and at a temperature providing a defined viscosity can provide fine fibres having a low shot content. US2012/247156 states that a content of shot having a dimension of 45 μm or more of 65% or less (e.g., 30 to 55%) is achievable: however the only examples given show a shot content of 40-50%; and the demonstrated fibre diameters are above 2.5 μm.

A commercially available alkaline earth silicate fibre SUPERWOOL® PLUS, (made by proprietary technology) has a classification temperature of 1200° C. (EN 1094-1) and has: —
a typical composition comprising in weight percent

| | |
|---|---|
| $SiO_2$ | 64-66% |
| CaO | 27-31 |
| MgO | 4-7 |
| $Al_2O_3$ | <0.8 |
| Others (including $Al_2O_3$) | <1. |

"Other" in the above context means any other material and typically these comprise oxides although other materials (e.g. fluorides) may be present.
a shot content below 40 weight %, typically 35-38%
fibre diameters in the range 2.5-3 μm
and in the form of a 25 mm thick blanket of density 128 $kg·m^3$
has a tensile strength of 75 kPa and a thermal conductivity at 1000° C. (ASTM C201) of around 0.25-0.29 $W·m^{-1}·K^{-1}$.

SUPERWOOL® PLUS thus already has the low shot content (38% maximum) and fine fibre diameters (2.5-3 μm) sought by US2012/247156.

Another commercially available alkaline earth silicate fibre for use at higher temperatures is SUPERWOOL® HT (made by proprietary technology), which has a classification temperature of 1300° C. (EN 1094-1) and has: —
a typical composition comprising in weight percent

| | |
|---|---|
| $SiO_2$ | 73-74.5 wt % |
| CaO | 22.2-26 wt % |
| MgO | 0.4-0.8 wt % |
| $Al_2O_3$ | 0.9-1.4 wt % |
| $K_2O$ | 0.5-0.8 wt % | with any other components or impurities amounting to at most 0.3 wt %.
a shot content below 50 weight %, typically 45-48%
fibre diameters in the range 3-3.5 μm arithmetic mean
and in the form of a 25 mm thick blanket of density 128 $kg·m^3$ has a tensile strength of 75 kPa and a thermal conductivity at 1000° C. (ASTM C201) of around 0.34 $W·m^{-1}·K^{-1}$.

Although methods for reducing shot from bulk fibre are known, and are used in particular to provide fibres for forming vacuum formed products from such fibres, these methods result in shortening of the remaining fibre. [In the following the process of mechanically removing shot from fibres is referred to as "deshotting" and the resultant fibres as being "deshotted"].

Since the tensile strength of a blanket is dependent (among other things) on the length of the fibres, blankets made from deshotted fibres are not commercially available in blanket form, or acceptable for such use, as they show low tensile strength, and in addition the further processing steps of deshotting add to cost.

Accordingly, there is a demand for masses of fibres having a suitable length distribution and shot content to enable them to be formed into blankets of adequate strength providing lower thermal conductivities at a given density than previously achieved. Further, there is a demand for masses of fibres having a low shot content that can be chopped or otherwise processed to form low shot mass of defined characteristics.

The applicants have found that design of the fibre spinning apparatus permits the formation of low shot melt formed fibres without the necessity of a deshotting step.

SUMMARY OF THE INVENTION

Accordingly, the present invention provides apparatus for forming melt-formed fibres comprising: —
- a source of molten material;
- a spinning head comprising one or more rotors each having an axis of rotation, at least one rotor being configured to receive molten material from the source of molten material at a region of the rotor to which melt is delivered;
- a plurality of nozzles or slots disposed around at least part of the one or more rotors, configured to supply a stream of gas;
- a conveyor disposed to receive fibres produced from the molten material; and
- a barrier between the spinning head and the conveyor, an upper edge of the barrier lying below a horizontal line lying in a first vertical plane including the axis of rotation of at least one rotor of the one or more rotors and intersecting the intersection of the axis of rotation with a second vertical plane orthogonal to the first vertical plane and including a vertical line through said region, the included angle θ between the horizontal line and a line in the first vertical plane joining the upper edge of the barrier and the intersection of the horizontal line and axis of rotation being in the range 40°-85°.

Apparatus as described permits lower shot versions of existing formulations to be provided. Fibre lengths from 1-50 cm are typically produced from such apparatus and the fibre distribution typically comprises some fibres of greater than 10 cm in length, for example greater than 20 cm in length or greater than 30 cm in length.

Accordingly, among other things, the present invention further provides a mass of melt-formed biosoluble fibres having an overall composition in weight percent
- $SiO_2$: 62-68%
- CaO: 26-32%
- MgO: 3-7%
- Others: <1% the fibres having a arithmetic mean diameter <2 μm and comprising fibres of a length greater than 10 cm, the mass having a shot content of shot >45 μm of less than 35 wt %, and capable of being formed by entanglement into a blanket having: —
- a density of 128 kg·m$^{-3}$;
- a thickness of 25 mm;
- a content of shot >45 μm of less than 35 wt %;
- a tensile strength >50 kPa.

By "a mass of melt-formed biosoluble fibres" is meant a large quantity or aggregate of such fibres, including any amount from 0.5 grams upwards, including more than 1 gram, more than 10 grams, more than 100 grams, more than 1 kilogram, or more than 10 kilograms.

The scope of the disclosure is indicated in the Claims (which are incorporated herein by reference) but extends also to any new and inventive matter disclosed herein with reference to the following non-limitative description and drawings in which: —

DESCRIPTION OF DRAWINGS

FIG. 8 shows apparatus for measuring tensile strength of blanket.

DETAILED DESCRIPTION

The Fibre Forming Process

As stated above, a known process for the manufacture of inorganic fibres is to supply a stream of a molten material of the desired chemical composition to a high-speed rotor (with or without blowing air around the rotor), such that fibres are flung off the rotor and collected for subsequent processing.

The process is hypothesised to work by a droplet of molten material being flung off the rotor and drawing a "tail" of molten material that forms the fibre. The droplets form part at least of the shot.

For the process to work the viscosity of the molten material must be appropriate.

The molten material is typically held in a container having heating/insulation means to keep the molten material at a suitable temperature.

As viscosity depends upon temperature, control of the temperature of the molten material is advisable. For each material a different range of temperatures will provide the optimum viscosity. Ideally the molten material as it hits the rotor should be within ±150° C. preferably within ±100° C., and more preferably within ±50° C. of the optimum temperature for the molten material concerned. It is advantageous to monitor the temperature of the stream of molten material [e.g. using a pyrometer] as it leaves the container [and ideally as it hits the rotor] and to use this to control supply of heat to the molten material.

To ensure best performance, the stream of molten material should be uninterrupted for as long as possible during the fibre forming process. This means that the pour rate of the molten material should be sufficiently high to provide a continuous stream and not so low as to break up into droplets of molten material.

Figure 1:
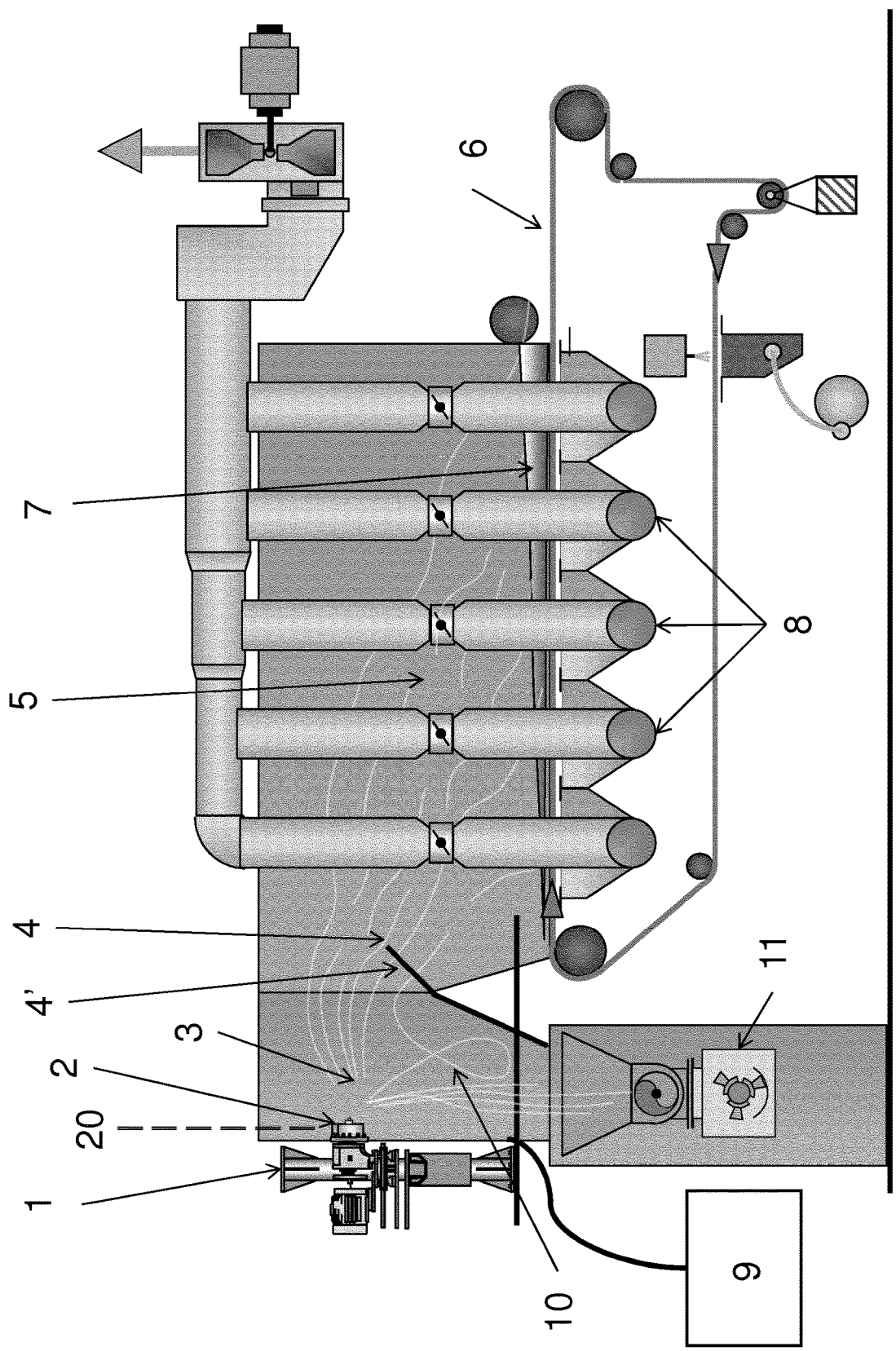
FIG. 1 is a schematic illustration of a conventional fibre forming machine.
Figure 2:
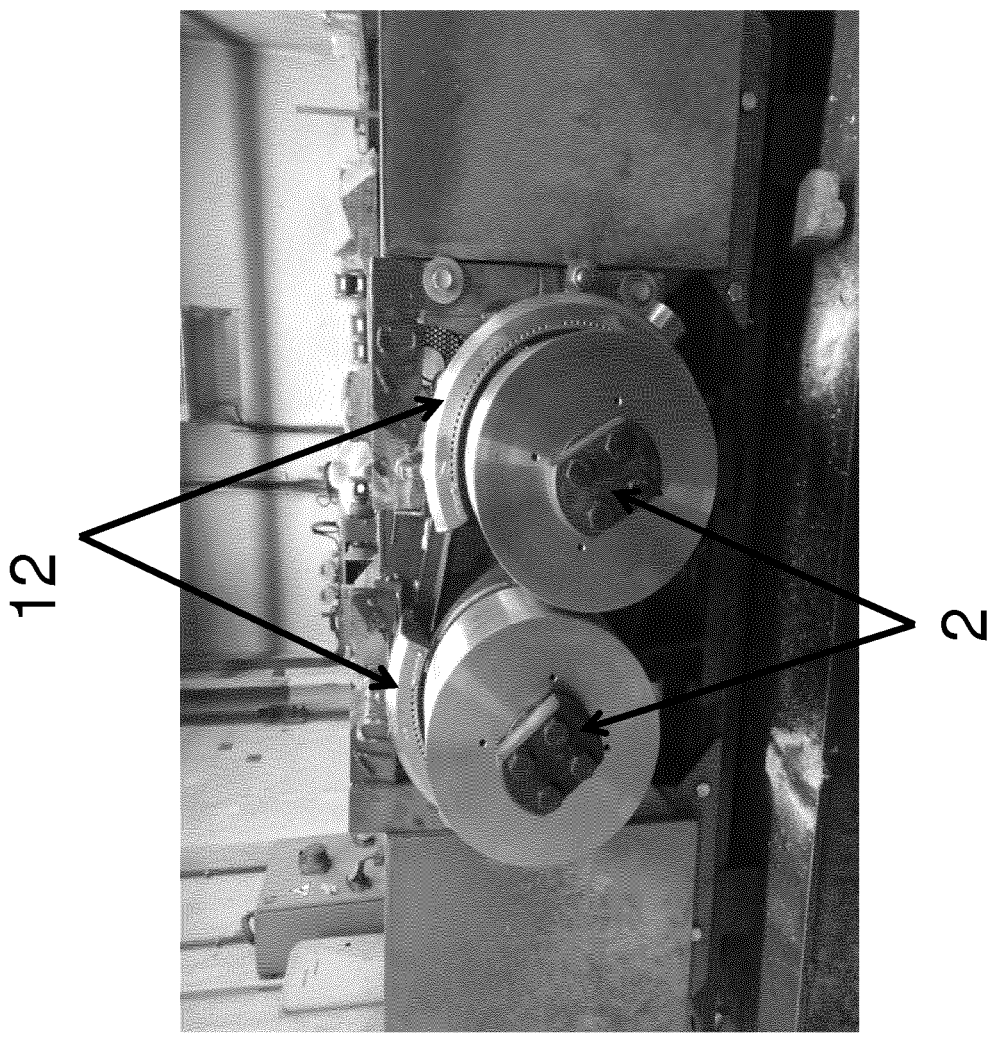
FIG. 2 is a schematic illustration showing an air ring in accordance with the present invention.

FIGS. 1 and 2 show fibre forming apparatus in which a motor arrangement 1, drives a rotor 2 housed in a fibre forming region 3 delimited at an end remote from the rotor by a barrier 4. Beyond the barrier 4 is what is conventionally known as a "wool bin" 5 where in use fibres settle onto a conveyor 6 to form a fleece of loose fibres 7 that may then be passed on to further processing [e.g. by "needling" to form a blanket]. Extractors 8 remove air from below the conveyor assisting draw down of fibre from the wool bin to the conveyor.

The apparatus also comprises a blower 9 that passes air [typically at 50 kPa or less above atmospheric] through an air ring 12 into the fibre forming area behind the rotor 2.

FIG. 2 shows the rotor arrangement which comprises two rotors 2, although a single rotor or more than two rotors may conventionally be used. As is conventional, one rotor is displaced from and placed slightly above the other, the appropriate angle of displacement and separation between the rotors 2 being a matter of design. Suitable angles and displacements are discussed, for example, in WO92/12939 and WO2015/055758 but typically the rotors have a separation of [2-10 mm] and the angle between horizontal and a line connecting the axis of one rotor to the axis of the other rotor is in the range [0-15° (typically) and 2-10° (preferred)]. The entire assembly of rotors may be displaced from the vertical as in U.S. Pat. No. 4,238,213. One or more of the rotors may be mounted at one end of a drive shaft with at least two spaced bearings supporting the drive shaft within a direct drive mechanism, which may be mounted with shock absorbers in a mount.

Fibre is produced as melt is flung from the peripheries of the rotors; once it has been made it needs to be moved away from the rotors into the wool bin. This is done partially by the residual velocity of the fibre and shot, and partly by the use of gas (usually air) moving generally perpendicular to the travel of the fibres which are then transported into the wool bin. The equipment used is generically referred to as 'air rings' or 'stripper rings'; the name ring comes from the shape, which forms part circles around the outside of the spinning rotors. As can be seen from FIG. 2, the air ring 12 typically comprises holes in metal blocks (typically 50-100 holes per block) with the air supply charged by a blower.

Preferably the air rings extend around as much of the periphery of the rotor as possible without disrupting the melt stream. For example, for a given rotor the air ring may extend around >180°, >200°, >220°, or >240° of the rotor periphery.

Figure 11:
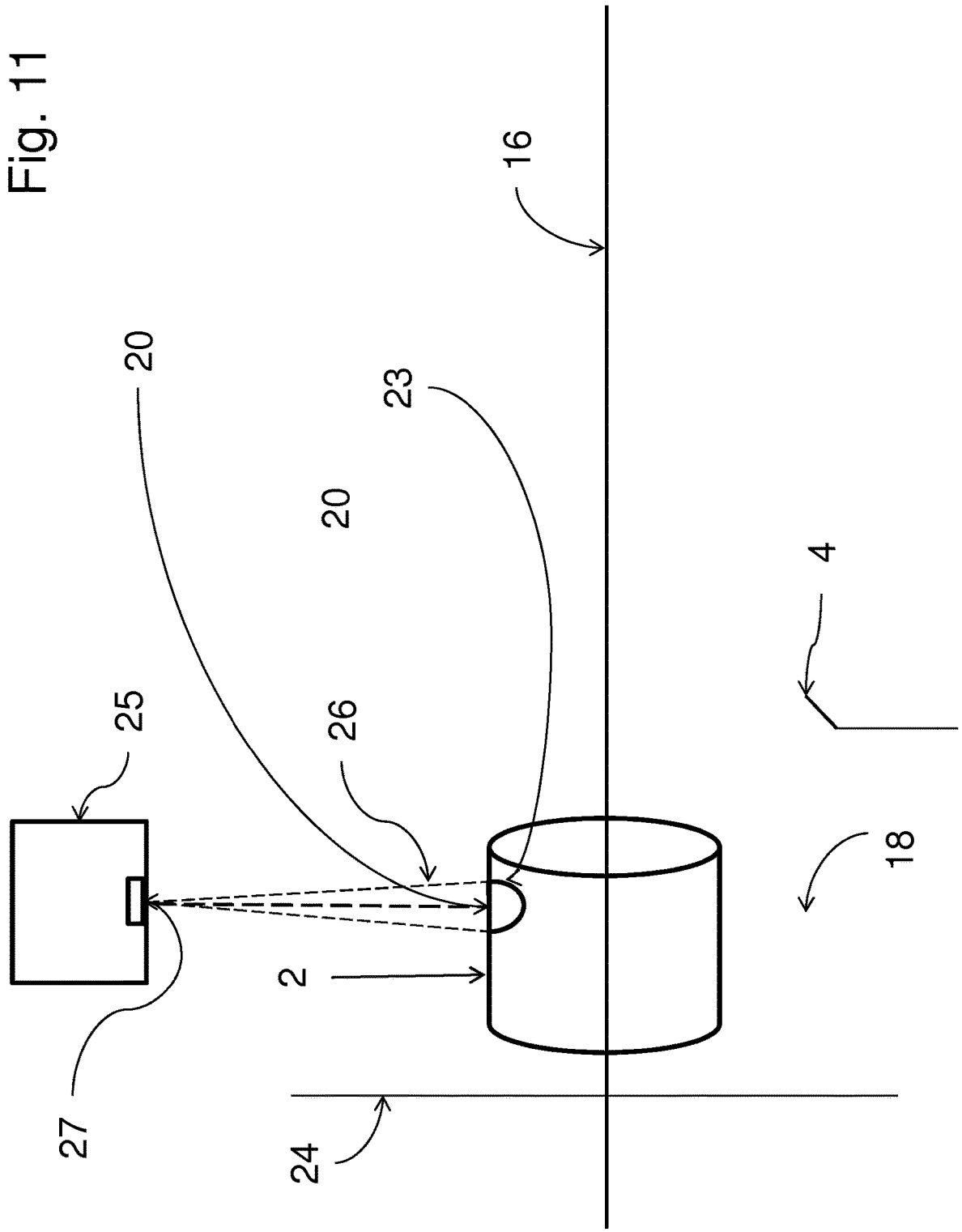
FIG. 11 shows schematically a side view of the rotor of FIG. 10 and delivery of melt from a melt source to a region proximate the rotor.

In operation melt drops as a melt stream from a source of molten material 25 [FIG. 11] onto the rotor 2 and is spun off to form fibres, fibre formation being assisted in part by the air flow from blower 9. Melt sources can comprise any type appropriate to the nature of the material being melted. This is conventional technology and exemplified, for example, in US2012/0247156.

Typically melt sources comprise a chamber for melting and holding molten the constituents of the melt and a tapping hole in the base of the chamber to permit the melt to be released when required. In practice, point-like precision of impact of the melt on the rotor is not possible, and cone 26 from the source 25 to the region 23 indicates a range of possible melt stream paths, such that the melt can land on the rotor over a region 23. The melt stream is shown schematically as a dotted line 20 representing a vertical line through the region 23. The vertical line 20 may pass anywhere through region 23, for example through the centroid of region 23 on the rotor, and where melt is delivered vertically from an orifice 27 in the source of molten material 25, the vertical line 20 may conveniently pass through the centroid of the melt delivering orifice 27.

In practice, since the melt stream may lie off this vertical line anywhere within the region 23, it may prove necessary to arrange for the rotor to be movable to ensure the melt stream falls on the optimum position for the melt in question. Typically, the melt is preferred to impinge on the first rotor it meets, on the front half of the rotor [e.g. between ¼ and ½ the depth of the rotor from the front (conveyer facing) face of the rotor and to impinge within 0-90°, typically 18-72° (e.g. 18-30°) of a vertical plane including the rotor axis either in advance or behind the direction of rotation of the rotor. The size of the region 23 will depend upon the geometry of the source 24 and its position relative to the rotor. Fibres produced from the melt are carried by the stream of gas from the rotors to pass over the upper edge of the barrier 4 towards the conveyer 6; while shot and short fibre falls back from the lip of the barrier 4 to a waste chute 10 (sometimes called the "shot pit") from which the waste shot and fibre passes to a granulator which breaks up the waste preparatory for disposal or re-use.

The applicant previously considered the slope from the upper edge of the barrier 4 to the waste chute 10 to be a region where further shot and fibre separation could occur, with the fibre being blown up the slope to the upper edge of the barrier 4.

Such apparatus typically produces fleece with a shot content of 45-50% assuming all other parameters (e.g. tap stream temperature and pour rate are optimal).

A problem with this apparatus is that the use of a low pressure air system implies high volumes of air to strip the fibres from the rotor and this leads to turbulence and eddying within the waste chute 10 such that some shot initially stopped by the barrier 4 can be blown up the slope of the barrier 4 and into the wool bin 5.

The applicants have realised that by lowering the upper edge of the barrier relative to the rotor and shortening the distance from the rotor to the barrier, there is a lower chance of eddying such that shot and short fibre falling from the barrier towards the waste chute is less likely to be blown back over the barrier.

Figure 3:
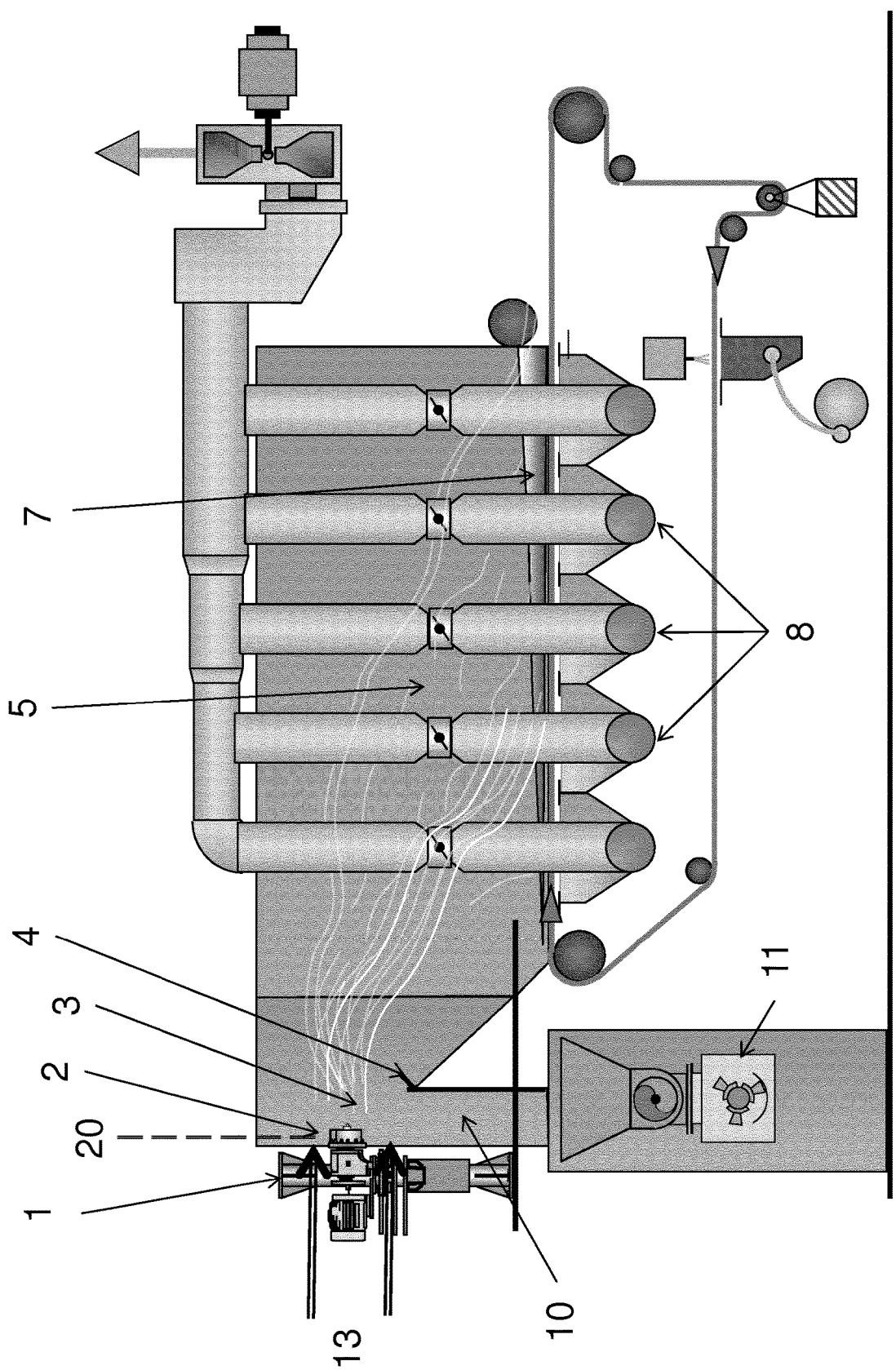
FIG. 3 is a schematic illustration of a fibre forming machine in accordance with the present invention.
Figure 4:
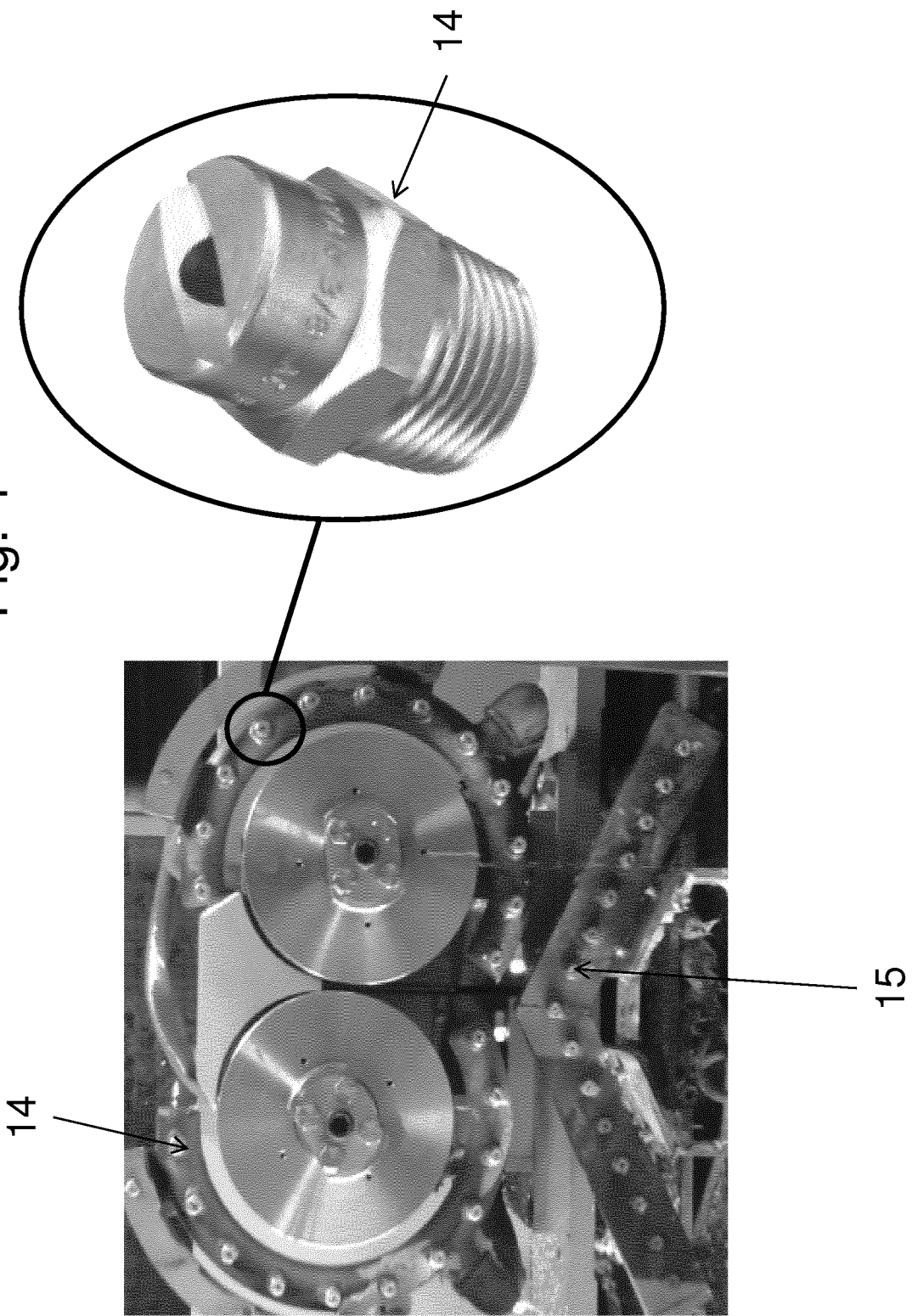
FIG. 4 is a schematic illustration showing a compressed gas jet system in accordance with the present invention and showing in part expanded form a gas jet.

FIGS. 3 and 4 show fibre forming apparatus in accordance with the present invention in which like integers carry the same reference signs as FIG. 1.

In this apparatus rather than a blower 8, compressed gas under high pressure [typically >100 kPa above atmospheric] is supplied to a series of flat spray nozzles 14 distributed in a ring around the rotors 2. This provides more efficient separation of the fibre and shot so that more fibre goes into the wool bin 5 and more shot drops down into the waste chute 10. A secondary blowing device is also provided under the rotors, this provides further separation of fibre and shot, but also improved flow of fibre off the barrier, and prevents fibre laden shot returning back up the ducting into the wool bin.

Suitable spray nozzles are for a flat spray pattern without hard edges. They come with several spray angles; the type used by the applicant is Delevan® ¼ AC 20 15 as shown in the expanded portion of FIG. 4.

This process typically allows a shot content of 30-45% to be achieved for alkaline earth silicate fibres without deshotting.

Figure 5:
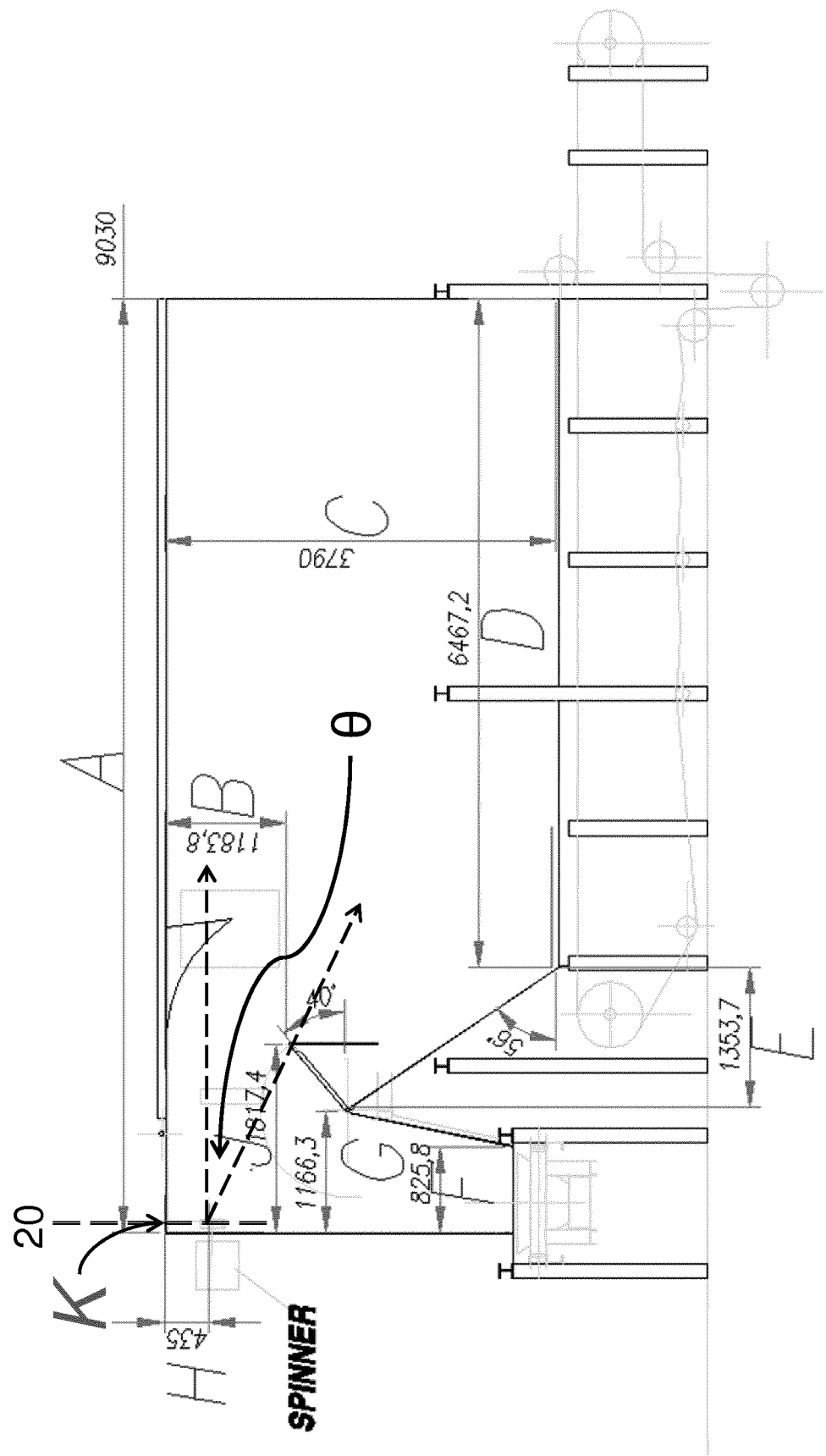
FIG. 5 is a schematic diagram showing dimensions of a typical fibre forming machine.
Figure 6:
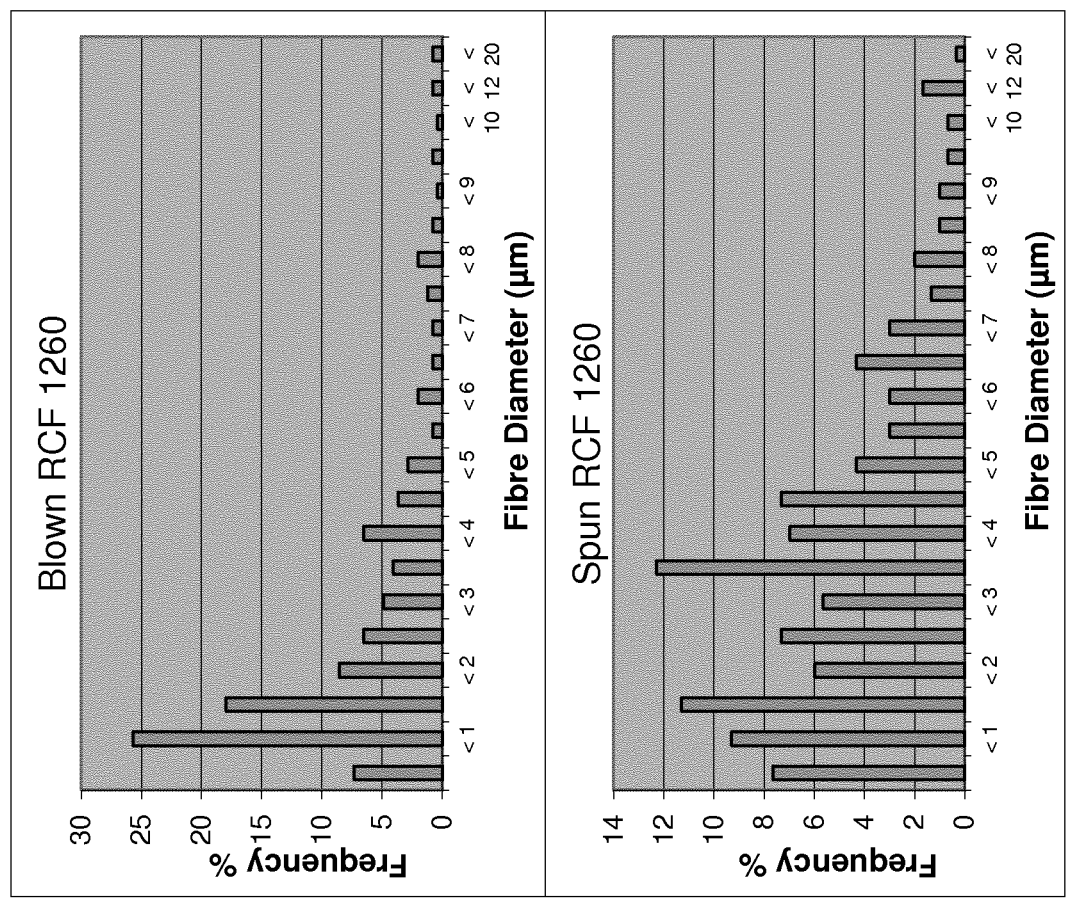
FIG. 6 shows fibre diameter distributions for an aluminosilicate fibre (RCF) produced by blowing and spinning respectively.
Figure 9:
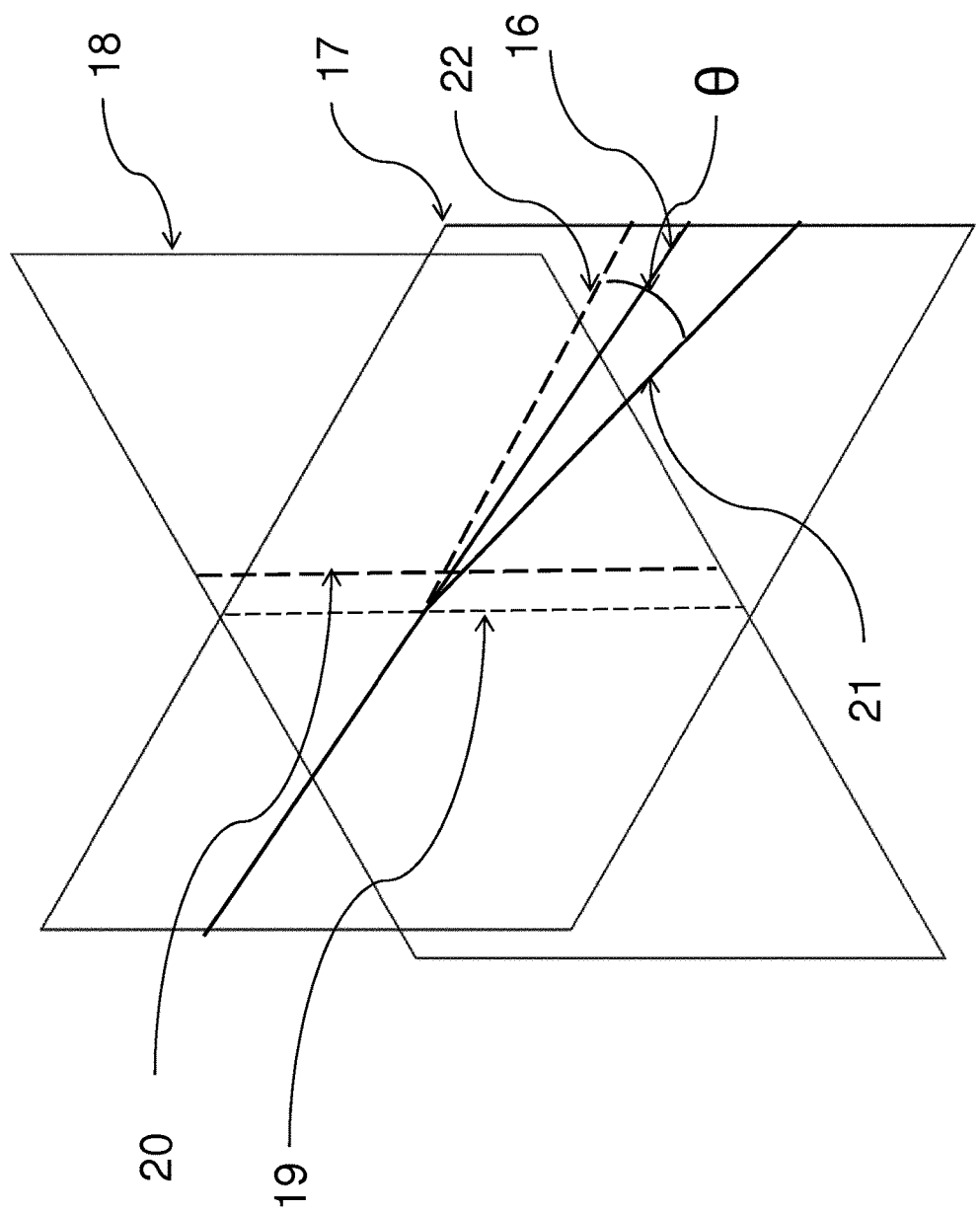
FIG. 9 shows schematically lines and planes used in defining the invention.

FIG. 5 shows the construction of FIG. 1 with dimensions, and shows schematically the angle θ, the determination of which is shown in greater detail in FIG. 9.

FIG. 9 shows the axis of rotation 16 of a rotor and a vertical plane 17 including axis 16.

Plane 17 intersects orthogonal vertical plane 18 along line of intersection 19, and vertical plane 18 includes vertical line 20 which passes through the region 23 on the rotor to which melt is delivered.

Line 21 lies within plane 17 and extends from the intersection of axis of rotation 16 with plane 18 to the upper edge of the barrier 4.

Horizontal line 22 lies within plane 17 and meets the intersection of axis of rotation 16 with plane 18 [When the axis of rotation 16 is horizontal, lines 16 and 22 are identical]. The angle θ is the angle between line 21 and horizontal line 22.

Figure 10:
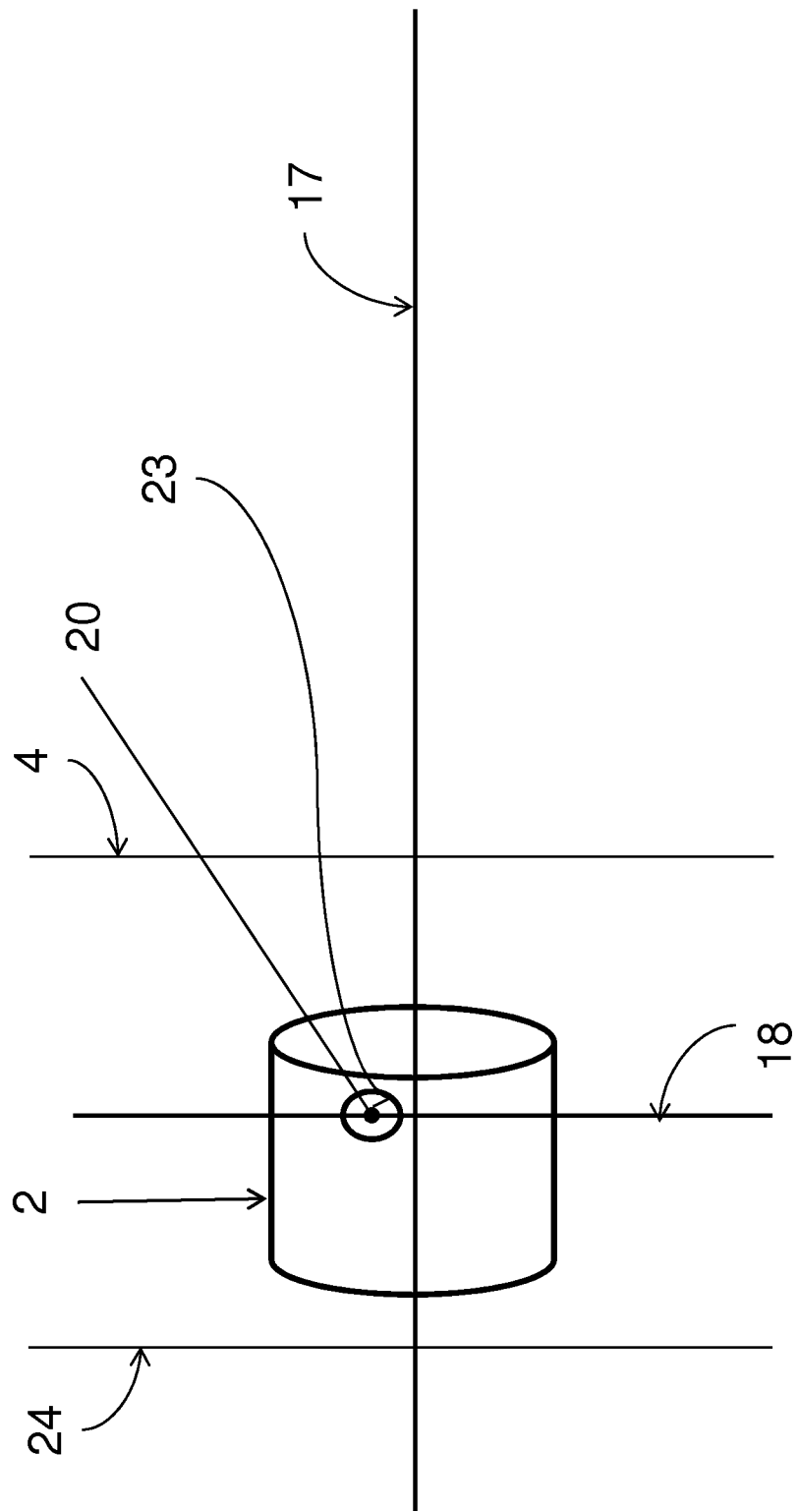
FIG. 10 shows schematically a plan view of a rotor.

FIG. 10 shows schematically in plan the rotor 2 positioned by the back 24 of the apparatus and the barrier 4. The region 23 may lie in advance or behind top centre in the direction of rotation of the rotor 2.

Table 1 compares the apparatus of FIG. 1 with the apparatus of FIG. 3.

TABLE 1

| Dimension | Apparatus of FIG. 1 | Apparatus of FIG. 3 |
|---|---|---|
| A - Length from end to end | 9030 mm | 10600 mm |
| B - Height of barrier below roof | 1183.8 mm | 1400 mm |
| C - Height of conveyor below roof | 3790 mm | 3900 mm |
| D - Length of conveyor internal of wool bin | 6467.2 mm | 9350 mm |
| E - Distance from conveyor to mouth of waste chute | 1353.7 mm | 750 mm |
| F - Width of base of waste chute | 825.8 mm | 525 mm |
| G - width of mouth of waste chute | 1166.3 mm | 525 mm |
| H - Height of rotor axis below roof | 435 mm | 435 mm |
| J - Distance of barrier from rotor end of apparatus | 1817.4 mm | 600 mm |
| K - Distance from vertical line through centre of region 23 to back end of apparatus | 275 mm | 275 mm |
| B − H - Height of rotor centre above barrier | 748.8 mm | 965 mm |
| Θ | 26.8° | 74.6° |
| Gas stream velocity | 16-17 m·s$^{-1}$ | 55-100 m·s$^{-1}$ |

The principle difference between the designs is the increase in the angle θ from below 30° to above 40° and the higher air velocity (above 40 m·s$^{-2}$). This difference results in a lower shot content for fibres of a given chemistry produced on the Apparatus of FIG. 3 than the Apparatus of FIG. 1.

In addition, the increased angle can be achieved by bringing the upper edge of the barrier closer to the rotor and in consequence permits a longer conveyor to be used for a given overall length of the wool bin. This longer conveyor improves uniformity of lay down of fibre.

The improvements achieved for a given chemistry, tap stream temperature, and rotor speeds are indicated below with reference primarily to alkaline earth silicate fibres but similar improvements will apply to other chemistries [including, without limitation, aluminosilicate chemistries, alkali metal aluminosilicates]. The following indicates some of the relevant variables that need to be considered in providing optimal fibre production.

Tap Stream Temperature.

The optimal value is chemistry dependent. For calcium magnesium silicate chemistries, particularly with silica contents below about 70% (e.g. SUPERWOOL® PLUS mentioned above) poor results arise if the tap stream temperature is less than 1350° C. or greater than 1600° C., and preferably the temperature is 1450° C.±50° C.

In contrast, for calcium silicate chemistries (e.g. SUPERWOOL® HT mentioned above) the tap stream temperature is preferably in the range 1650-1800° C.

For magnesium silicate chemistries the tap stream temperature is preferably in the range 1750-1850° C.

For aluminosilicate chemistries the tap stream temperature is preferably in the range 1950-2200° C.

For potassium aluminosilicate chemistries the tap stream temperature is preferably in the range >2050° C.

Pour Rate.

The optimal pour rate depends upon the capacity of the rotor to convert the tap stream into fibre and ensuring a stable tap stream. For 20 cm (8") rotors good results are typically obtained with a pour rate between 250 kg/hr and 800 kg/hr. Below 250 kg/hr the tap stream tends to break up, and the resultant "splatter" creates damaging shot. Preferably, for such rotors, the pour rate is 400-750 kg/hr.

Rotor Speed.

For 20 cm (8") rotors this is preferably 15000-17000 rpm [equivalent to accelerations of about 250-320 km·s$^{-2}$] although higher rotational speeds can result in finer fibre. This is substantially greater than 12000 rpm, which is the usual speed for this technology and equivalent to about 160 km·s$^{-2}$. Results when speed is below 10000 rpm [equivalent 110 km·s$^{-2}$] are less beneficial.

Blankets formed using fibres produced under these spinning conditions using the apparatus claimed possess lower thermal conductivity and shot content than fibres produced at slower linear speeds and retain acceptable mechanical properties such as tensile strength. As an indication, Table 2 shows typical tensile strengths and shot contents of blankets of various density formed from specified fibres: —

TABLE 2

| Composition | | Aluminosilicate fibre | | Alkaline earth silicate fibre (calcium magnesium silicate fibre of SUPERWOOL ® PLUS composition] | |
|---|---|---|---|---|---|
| Blown or spun | | Blown | | Spun | |
| Spinning apparatus | | N/A | Apparatus of FIG. 1 | | Apparatus of FIG. 3 |
| Spinning speed [all with 20.3 cm (8") rotors]) | | N/A | 12,000 rpm | | 15,000 rpm |
| Tensile strength | Density of blanket | | | | |
| | 64 kg/m$^3$ | 17 kPa | >25 kPa | >25 kPa | >25 kPa | 25 kPa |
| | 96 kg/m$^3$ | 31 kPa | >45 kPa | >40 kPa | >40 kPa | 55 kPa |
| | 128 kg/m$^3$ | 44 kPa | >60 kPa | >50 kPa | >50 kPa | 55 kPa |
| Average shot >45 μm* | | 50% typical | 50% typical | 50% typical | 35-38% typical | 28-35% |
| Typical arithmetic mean fibre diameter [μm] | | <2 | 2.5-3 | 2.5-3 | 2.5-3 | <2 |

TABLE 2-continued

| Composition | Aluminosilicate fibre | | Alkaline earth silicate fibre (calcium magnesium silicate fibre of SUPERWOOL ® PLUS composition] | | |
|---|---|---|---|---|---|
| Typical thermal conductivity at 1000° C. [W · m$^{-1}$ · K$^{-1}$] | 0.30 | 0.34 | 0.38 | 0.29 | 0.21 |

*Under ISO guidelines 10635 for fibre making provide that the testing party may declare what value they are using. For the purpose of this application, shot comprises any particulate material that is over 45 μm in size \* Under ISO guidelines 10635 for fibre making provide that the testing party may declare what value they are using. For the purpose of this application, shot comprises any particulate material that is over 45 μm in size.

As can be seen from the table: —
- the tensile strength for spun fibre blankets are significantly higher than for blown fibre blanket, this significantly helps in handling
- moving from Apparatus of FIG. 1 to Apparatus of FIG. 3 results in a major drop in shot content and correspondingly lower thermal conductivity
- increasing the spinning speed results in a much lower thermal conductivity since fibres of diameter comparable with blown fibres can be achieved with a lower shot content.

Further details are set out in the following examples: —

Example 1

Calcium magnesium silicate fibres of chemistry indicated in Table 3 were produced in Apparatus as shown in FIG. 3 with the dimensions given in Table 1 using a tap stream at a temperature of 1450±50° C. directed to on 20.3 cm [8"] diameter rotor rotating at a speed of 15,000 rpm. Table 3 compares the chemistry of Example 1 with typical composition of SUPERWOOL® PLUS and shows typical measured properties:

TABLE 3

| | Example 1 | SUPERWOOL ® PLUS |
|---|---|---|
| | | Amount in wt % |
| Component | | |
| CaO | 30.1 | 27-31 |
| MgO | 5.4 | 4-7 |
| SiO$_2$ | 64.6 | 64-66 |
| Property | | |
| Arithmetic mean diameter | 1.85 μm | 3-3.5 μm |
| Cumulative total for shot 45 μm or above | 29-33% | 35-38% |

The thermal conductivity for a blanket, formed from the fibres of Example 1, with density 125.4 kg·m$^{-1}$·K$^{-1}$ is shown in Table 4 and is a significant improvement over SUPERWOOL® PLUS blanket which has a typical value at 1000° C. of 0.25-0.29 W·m$^{-1}$·K$^{-1}$.

TABLE 4

| Temperature (° C.) | Sample | Commercial SUPERWOOL ® PLUS (datasheet values) | % difference |
|---|---|---|---|
| 200° C. | 0.04 | 0.05 | 20% |
| 400° C. | 0.06 | 0.08 | 25% |

TABLE 4-continued

| Temperature (° C.) | Sample | Commercial SUPERWOOL ® PLUS (datasheet values) | % difference |
|---|---|---|---|
| 600° C. | 0.10 | 0.12 | 17% |
| 800° C. | 0.15 | 0.18 | 17% |
| 1000° C. | 0.21 | 0.25 | 16% |
| 1100° C. | 0.24 | n/a | |

Example 2

Calcium magnesium silicate fibres of chemistry indicated in Table 5 were produced in Apparatus as shown in FIG. 3 with the dimensions given in Table 1 using a tap stream at a temperature of 1680-1730° C. directed to on 20.3 cm [8"] diameter rotor rotating at a speed of 15,000 rpm. Table 5 compares the chemistry of Example 2 with typical composition of SUPERWOOL® HT and shows typical measured properties:

TABLE 5

| | Example 2 | SUPERWOOL ® HT |
|---|---|---|
| | | Amount in wt % |
| Component | | |
| CaO | 24.68 | 22.2-26 |
| Al$_2$O$_3$ | 1.18 | 0.9-1.4 |
| K$_2$O | 0.77 | 0.5-0.8 |
| MgO | 0.6 | 0.4-0.8 |
| SiO$_2$ | 72.72 | 73-74.5 |
| Property | | |
| Arithmetic mean diameter | 1.85 μm | 3-3.5 μm |
| Cumulative total for shot 45 μm or above | 33.24% | 38.25% |

The thermal conductivity for a blanket with density 117.5 kg·m$^{-1}$·K$^{-1}$ is shown in Table 6 and compares well with a typical value at 1000° C. of 0.34 W·m$^{-1}$·K$^{-1}$ for SUPERWOOL® HT.

TABLE 6

| | Conductivity (W/m · K) | | |
|---|---|---|---|
| Temperature (° C.) | Example 2 | Commercial SUPERWOOL ®HT (datasheet values) | % difference |
| 200° C. | 0.04 | 0.04 | 0% |
| 400° C. | 0.07 | 0.08 | 13% |
| 600° C. | 0.11 | 0.14 | 21% |
| 800° C. | 0.18 | 0.23 | 22% |
| 1000° C. | 0.26 | 0.34 | 24% |
| 1200° C. | 0.37 | 0.48 | 23% |

Figure 7:
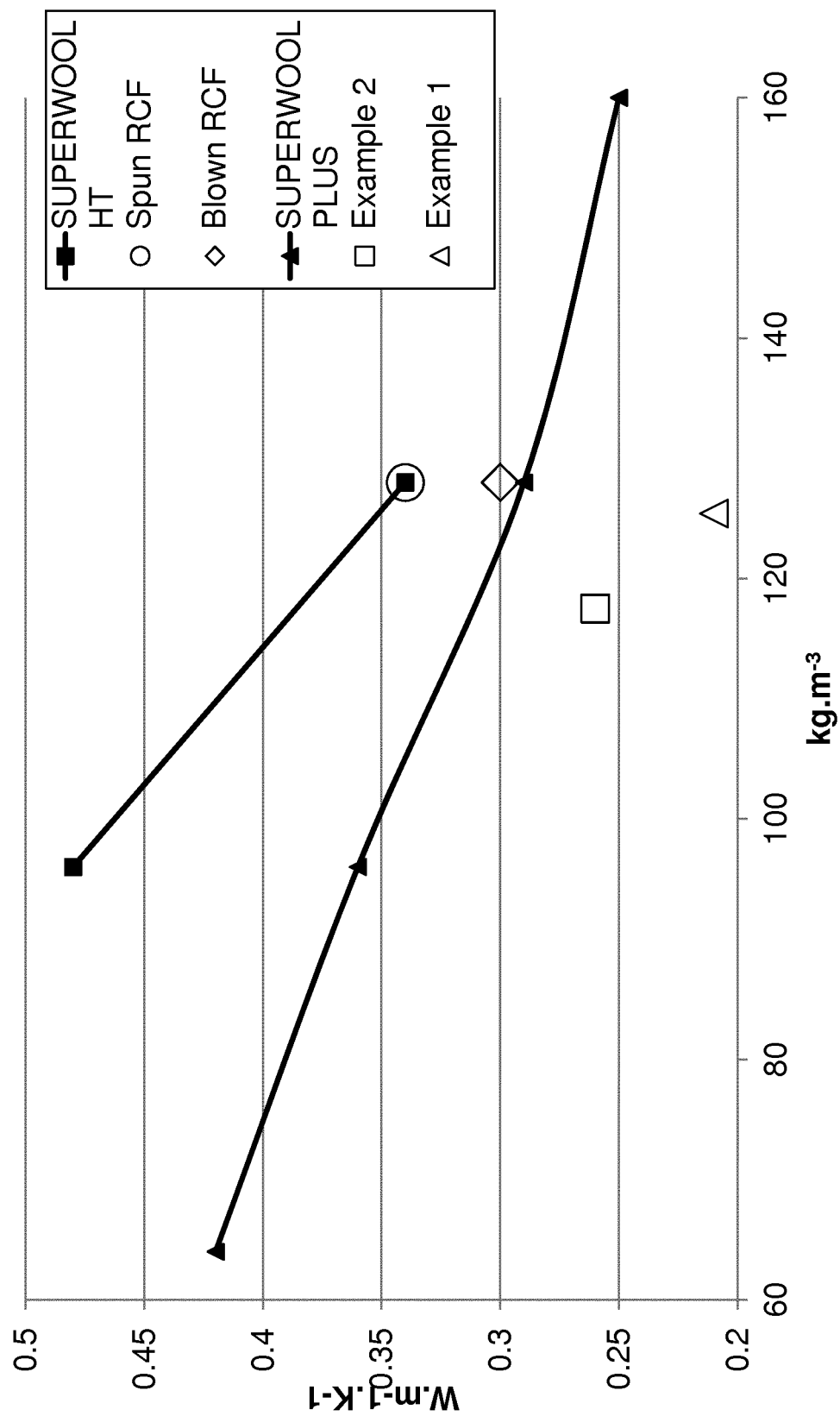
FIG. 7 shows the values of thermal conductivity for a number of different fibres.

It is known that the thermal conductivity of a blanket also depends on density of the blanket, and FIG. 7 shows the commercial literature values of thermal conductivity against blanket density for SUPERWOOL® PLUS and SUPERWOOL® HT and the blown and spun RCF fibres described above, together with the experimental values for Examples 1 and 2.

As can be seen the fibres produced using the Apparatus of FIG. 3 with a rotor giving an acceleration of about 250 km·s$^{-2}$ produces significantly lower thermal conductivities than commercial product and indeed lower than blown RCF.

The fibres can be used to produce an insulating blanket of thermal conductivity <0.21 W·m$^{-1}$·K$^{-1}$ at 1000 C and 128 kg/m$^3$ density. This is possible due to the properties of the fibres—fine, low shot, with extremely low thermal conductivity in their own right.

Density of a blanket also correlates with the thermal mass of the blanket, which is of particular importance in cycling conditions. By providing a required thermal conductivity with a lower density blanket than a conventional blanket of equivalent composition, the present invention reduces the thermal mass of the blanket.

If the lines for SUPERWOOL® PLUS and SUPERWOOL® HT respectively in FIG. 7 are extrapolated to the thermal conductivities shown for Examples 1 and 2 respectively, densities of 20 kg/m$^{-3}$ or more above those of Examples 1 and 2 would be indicated as necessary for the same thermal conductivity.

Prior to the development of the apparatus disclosed herein production of such blankets was impossible: whilst shot could conceivably be removed from fibres produced via another method, the shot cleaning operation shortens the fibres, making them unsuitable for the production of a blanket.

Example 3

Figure 12:
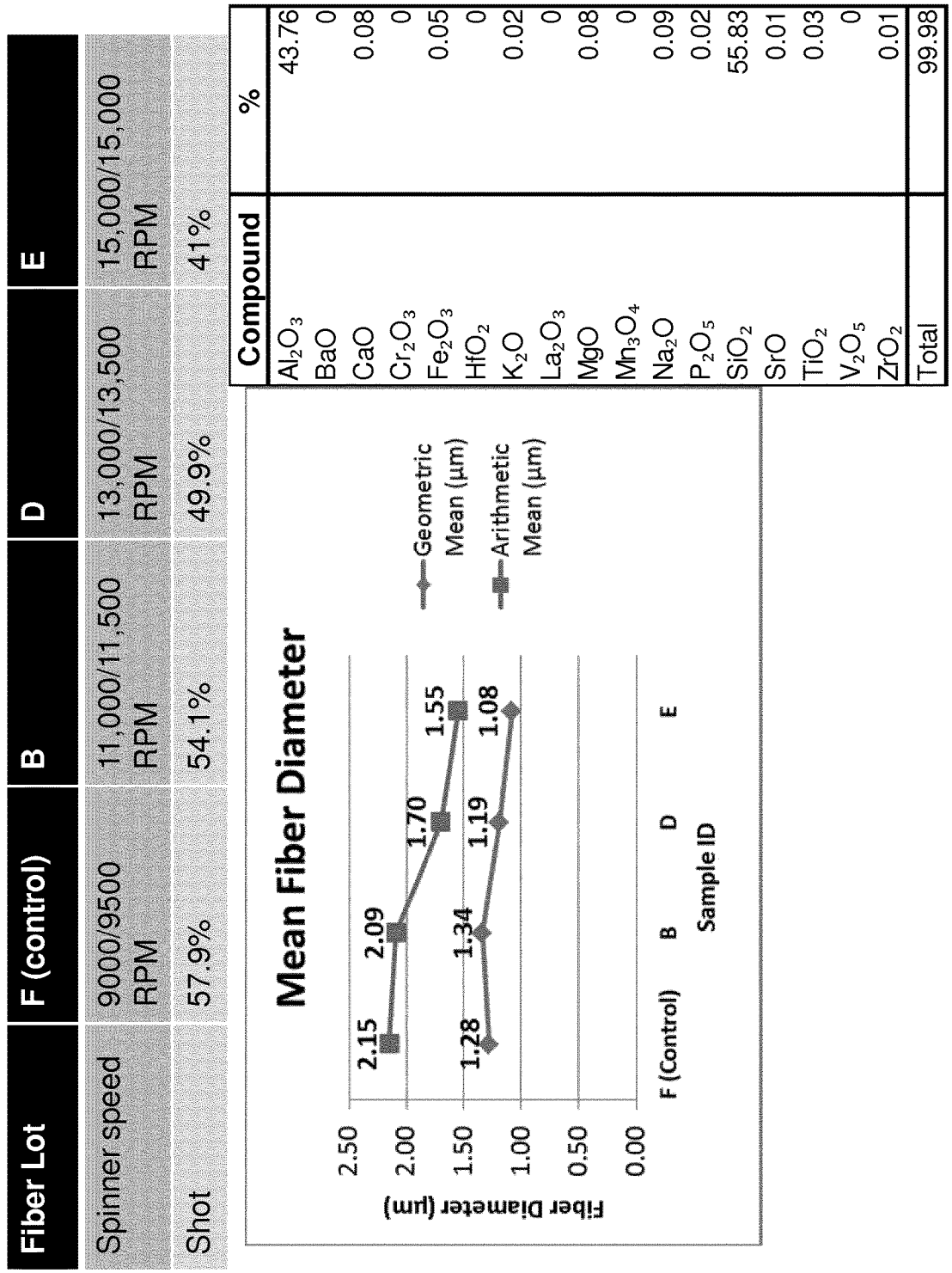
FIG. 12 is a summary of trials on an RCF composition.

An aluminosilicate fibre was trialled on spinning apparatus as shown in FIG. 3 using pairs of 20 cm (8") rotors, and the rotor speed increased stepwise from 9000/9500 rpm (one rotor at 9000, the other at 9500 rpm) through to both rotors running at 15,000 RPM. Fibre diameter and shot content were measured and the results and fibre composition are set out in FIG. 12.

With increasing rotor speed both fibre diameter and shot content decreased to provide, at higher speeds, fibres having fibre diameters similar to blown RCF, but shot content similar to or significantly less than spun RCF.

In light of the results of Example 3 the applicants have compared: —
  aluminosilicate materials made with the presently claimed apparatus using the rotor configuration of Example 3 and high rotor speeds (both rotors at 14,500 rpm); with,
  materials made using the presently claimed apparatus using lower rotor speeds
  commercially available materials.

Example 4

A "standard" spun refractory ceramic fibre has a typical composition in weight percent: —
Alumina 46-48%
Silica 52-54%
and is exemplified by Cerablanket™ (a trademark of Morgan Advanced Materials plc). Such a material has a shot content >45 µm of about 50%.

A material of the same composition made using the high rotor speeds (both rotors at 14,500 rpm) has a shot content >45 µm of 43-46%.

Comparative results for thermal conductivity for a 128 kg/m$^3$ blanket measured by ASTM-C201 expressed in W/mK are shown in Table 7.

TABLE 7

| Temperature (° C.) | Thermal Conductivity (W/m · K) | | % difference |
|---|---|---|---|
| | Example 4 - 14500 rpm | Morgan Cerablanket ™ RCF (data sheet) | |
| 200 | 0.06 | 0.06 | 0% |
| 400 | 0.08 | 0.1 | 20% |
| 600 | 0.12 | 0.15 | 20% |
| 800 | 0.17 | 0.2 | 15% |
| 1000 | 0.23 | 0.27 | 15% |

Example 5

Blown fibres tend to be finer than spun fibres, and to hence provide lower thermal conductivity. However blown fibres tend to be shorter than spun fibres and blankets are difficult to make from blown fibres. Blown fibres also tend to have more shot than spun fibres. Typically blown RCF has a shot content >45 µm of above 50%, and above a spun fibre of like composition.

High alumina (HA) RCF fibre is known for meeting higher temperature applications than standard RCF fibre and is normally blown, as it has proven difficult in the past to spin or make into blanket.

HA fibres have typical compositions in weight percent: —
Alumina 50-53%
Silica 47-50%

Comparative results for thermal conductivity for a 128 kg/m$^3$ blanket measured by ASTM-C201 expressed in W/mK are shown in Table 8, which compares: —

A. a spun HA fibre with composition based on
  Alumina 50-52%
  Silica 48-50% made using the high rotor speeds (both rotors at 14,500 rpm) having a shot content >45 µm of 43-46%.

B. a "standard" blown refractory composition [Kaowool® a trademark of Thermal Ceramics, Inc.] with composition in weight %
  Alumina 46-48%
  Silica 52-54%
  With some substitution of up to 3% alumina by iron and titanium oxides.

C. a commercial HA product with composition based on
  Alumina 53%, Silica 46%, balance impurities.

As can be seen, spun fibres of a high alumina composition RCF produced on the apparatus of the present invention, are superior in thermal conductivity to blown RCF fibres whether of standard or high alumina composition.

TABLE 8

| | Thermal Conductivity (W/m · K) | | | | |
|---|---|---|---|---|---|
| Temperature ° C. | A High speed "HA" spun fibre | B Kaowool ® "standard" RCF blown blanket | C Commercial blown blanket | % difference from B | % difference from C |
| 200 | 0.05 | 0.05 | 0.07 | 0% | 29% |
| 400 | 0.08 | 0.1 | 0.11 | 20% | 27% |
| 600 | 0.13 | 0.15 | 0.17 | 13% | 24% |
| 800 | 0.19 | 0.2 | 0.24 | 5% | 21% |
| 1000 | 0.27 | 0.3 | 0.33 | 10% | 18% |
| 1200 | 0.36 | 0.39 | 0.44 | 8% | 18% |

The applicants have shown that a variety of aluminosilicate fibres (e.g. refractory ceramic fibres [RCF]— also known as aluminosilicate wool [ACW]) can be made using the methods and apparatus described herein to provide fibre masses of fibre diameter comparable to blown fibre, with fibre length comparable to spun fibre, and with low shot content. Such materials will be useful in many applications, including in automotive applications as further mentioned below.

Fibres that can be fiberised using the invention include any known melt spun fibre compositions, including, for example and without limitation: —

Any aluminosilicate fibre

Any alkaline earth silicate fibre, including without limitation: —

Fibres comprising in weight percent: —

| | |
|---|---|
| SiO$_2$ | 45%-85% |
| alkaline earth oxide | 15%-55% |
| components other than alkaline earth oxides and silicon dioxide | 0 to 20% |

Fibres comprising in weight percent:
SiO$_2$: 70-80%
CaO+MgO: 18-25%
Other: <3%

Fibres comprising in weight percent:

| | |
|---|---|
| SiO$_2$ | 70-80% |
| MgO | 10-29% |
| CaO | 1-9% |
| Al$_2$O$_3$ | <3% | components other than MgO or SiO$_2$ or CaO or Al$_2$O$_3$ 0-19%

Fibres comprising in weight percent: —
SiO$_2$: 62-68%
CaO: 26-32%
MgO: 3-7%
Others: <1%

Fibres comprising in weight percent:

| | |
|---|---|
| SiO$_2$ | 65-86% |
| MgO | 14-35% | components other than MgO or SiO$_2$ 0-20%.

Fibres comprising in weight percent:

| | |
|---|---|
| SiO$_2$ | 70-88.5% |
| MgO | 11-29.5% |
| SrO | 0.5-15.0% | components other than Mg) or SiO$_2$ or SrO 0-18.5%.

Fibres comprising in weight percent:

| | |
|---|---|
| SiO$_2$ | ≥70% |
| MgO | 5-20% |
| SrO | 0.5-15.0% |
| CaO | 0.5-15.0% | components other than MgO or SiO$_2$ or SrO or CaO 0-20%.

Fibres comprising in weight percent:

| | |
|---|---|
| SiO$_2$ | 65-86% |
| MgO | 14-35% | components other than MgO or SiO$_2$ 0-20%,
said components comprising but not limited to one or more oxides selected from the group CaO, SrO, Al$_2$O$_3$, ZrO$_2$, Li$_2$O, B$_2$O$_3$, Fe$_2$O$_3$ and lanthanide oxide or oxides.

Fibres comprising in weight percent:

| | |
|---|---|
| SiO$_2$ | 70 ± 4% |
| MgO | 22 ± 4% |
| Al$_2$O$_3$ | 6 ± 3% | components other than MgO or SiO$_2$ or Al$_2$O$_3$ 0-13%

Fibres comprising in weight percent:

| | |
|---|---|
| SiO$_2$ | 76 ± 4% |
| MgO | 18 ± 3% |
| CaO | 3.5 ± 2% | components other than MgO or SiO$_2$ or CaO 0-11.5%

Fibres comprising in weight percent:

| | |
|---|---|
| SiO$_2$ | 76 ± 4% |
| MgO | 18 ± 3% |

-continued

| | |
|---|---|
| CaO | 3.5 ± 2% |
| Al$_2$O$_3$ | 1.5 ± 1% | components other than MgO or SiO$_2$ or CaO or Al$_2$O$_3$ 0-11%

Fibres comprising in weight percent:

| | |
|---|---|
| SiO$_2$ | 76 ± 4% |
| MgO | 18 ± 3% |
| CaO | 3.5 ± 2% |
| Al$_2$O$_3$ | 1.5 ± 1% |
| SrO | 0.5 ± 0.5% | components other than MgO or SiO$_2$ or CaO or Al$_2$O$_3$ or SrO 0-11%

Fibres comprising in weight percent:

| | |
|---|---|
| SiO$_2$ | 73-74.5% |
| CaO | 22.2-26% |
| MgO | 0.4-0.8% |
| Al$_2$O$_3$ | 0.9-1.4% |
| K$_2$O | 0.5-0.8% |

Fibres comprising in mol percent:

| | |
|---|---|
| CaO | 5-60 mol % |
| MgO | 5-60 mol % |
| Al$_2$O$_3$ | 0-25 mol % |
| SiO$_2$ | 10-35 mol % |
| with | |
| CaO + MgO | 50-64 mol % |
| and | |
| CaO + MgO + Al$_2$O$_3$ + SiO$_2$ | 80-100 mol % |

Any alkali metal aluminosilicate fibre, including, without limitation: —

Fibres comprising in mole percent:

| | |
|---|---|
| Al$_2$O$_3$ | 5-90 mol % |
| K$_2$O | 12-40 mol % |
| SiO$_2$ | 5-80 mol % | in which SiO$_2$+Al$_2$O$_3$+K$_2$O>=80 mol %.

Fibres comprising in weight percent:

| | |
|---|---|
| Al$_2$O$_3$ | 32-50 wt % |
| SiO$_2$ | 21-45 wt % |
| Na$_2$O + K$_2$O | 20-27.5 wt % |
| wherein | |
| K$_2$O | 0-15 wt % |
| Al$_2$O$_3$ + SiO$_2$ + Na$_2$O + K$_2$O | ≥90 wt % | with the total of these components being 99%-100% by weight.

Fibres comprising Na$_2$O, Al$_2$O$_3$ and SiO$_2$, for example as set out in US2015/0144830.

Alkaline earth aluminates

Alkaline earth aluminosilicates

Alkali metal/alkaline earth aluminosilicates, including without limitation: —

Fibres comprising K$_2$O, MgO, Al$_2$O$_3$ and SiO$_2$, for example as set out in WO2015/011390.

Fibres comprising in weight percent:
- SrO 18 wt %-52 wt %
- Al$_2$O$_3$ 25 wt %-70 wt %
- SiO$_2$ 0 wt %-30 wt %
- K$_2$O+Na$_2$O 2 wt %-15 wt %

Fibres comprising in weight percent: —
- Al$_2$O$_3$ 32-50 wt %
- SiO$_2$ 21-45 wt %
- Na$_2$O+K$_2$O 20-27.5 wt %
- wherein
- K$_2$O 0-15 wt %
- Al$_2$O$_3$+SiO$_2$+Na$_2$O+K$_2$O 90 wt %

Fibres of any of the above mentioned classes of fibres comprising one or more further oxide or additives, including without limitation one or more oxide selected from the group: —
- One or more oxides of elements from groups 4-11 of the periodic table;
- One or more oxides of elements from group 3 of the periodic table;
- One or more oxides of lanthanoids [elements with atomic numbers 57-71]; and
- SnO$_2$, B$_2$O$_3$, P$_2$O$_5$.

Test Methods

Shot Content

Shot content is measured by a jet sieve method using a Hosokawa Micron Air Jet Sieve (from Hosokawa Micron Powder Systems).

To ensure that the fibres pass through the sieve, the sample has to be prepared by crushing, this breaks the fibres to short lengths which are no longer tangled together in clumps that otherwise might be mistakenly measured as shot. The jet sieve then uses ultrasonic energy to agitate the fibres and align them with the mesh of the sieve. Suction then pulls the fibres through and collects them in a high efficiency particulate arresting (HEPA) filter. By measuring the weight of the sample before and after sieving, the proportion of shot can be calculated.

In detail: —

Heat Treatment of Sample

To avoid moisture, or lubricants or other organic materials causing fibres to aggregate into "lumps"; preheating to an appropriate temperature for the sample [e.g. to 650° C.) to dry and/or burn off any lubricant/organic is appropriate if the sample is not known to be free of such materials.

Some materials may be too tough to be readily crushed in the following step, if so, heat treating to embrittle the fibres may be required.

The need for such heat treatment may be assessed by attempting the following steps and viewing the sample after sieving to determining whether sufficient fibrous material is retained in the sieve to affect the outcome of the measurement by more than the desired level of precision.

Crushing

Samples need to be crushed to break up the fibre tangles and to separate the shot from the fibre as well as to make the sections short enough to pass through the sieves' mesh. This has to be done in a manner that provides efficient shortening of the fibres without affecting the nature of the shot significantly.

Samples (typically 50-100 g or whatever size is appropriate for the die used) are crushed three times in a die at a minimum of 10 MPa (preferably about 12 MPa). Between crushes the samples are well stirred to break up lumps and compacts so that the subsequent pressing can work on any uncrushed material.

Most samples will be crushed sufficiently by this process, but further repetition may be required for "obstinate"

samples. The need for further repetition for a particular material, or higher crushing pressures, can be assessed by viewing the sample after sieving to determining whether sufficient fibrous material is retained in the sieve to affect the outcome of the measurement by more than the desired level of precision.

Weighing

A balance is used that meets or exceeds the following specification (e.g. Sartorius MSE1202S-100-DO)

Readability 0.01 g
Repeatability 0.005 g
Linearity 0.02 g
Range 0-800 g

The balance pan must also have a diameter>the sieve diameter and must be placed on a solid base to minimise vibrations.

The lid and sieve used (see below) are first weighed and then an appropriate amount of crushed sample is added, typically 20±0.5 g, measured to the nearest 0.01 g.

Sieving

Suitable apparatus comprises a Hosokawa Micron air jet sieve and lid; a Nilfisk GD930 vacuum cleaner; and a Stainless steel test sieve (BS410) designed for air jet sieve. For determining shot content as reported herein a 45 micron sieve was used. Any suitable jet sieve may be used.

Sieving with this apparatus comprises the steps: —
putting the lid on to the sieve,
placing the sieve on the jet sieve unit, and sealing thereto using a sieving time of 180 seconds under a reduced pressure of at least 4.7 kPa (19 inches of water),
during the sieving, if necessary, stopping sieving to brush off any material adhering to the lid through static electricity After sieving the sieve, lid, and retained shot are measured together and the amount of shot determined by difference.

Tensile Strength

The parting strength of a blanket is determined by causing rupture of test pieces at room temperature.

Samples are cut using a template (230±5 mm×75±2 mm). The samples are dried at 110° C. to a constant mass, cooled to room temperature and then measured and tested immediately.

The width is measured using a steel rule to a 1 mm accuracy across the middle of the piece and the thickness of the sample is measured on each sample (at both ends of the sample) using the EN1094-1 needle method.

A minimum of 4 samples for each test are taken along the direction of manufacture.

The samples are clamped at each end by clamps comprising a pair of jaws having at least 40 mm×75 mm in clamping area with serrated clamping surfaces to prevent slippage during the test. These dimensions give an unclamped span of 150±5 mm to be tested. The clamps are closed to 50% of the sample thickness (measured using a Vernier caliper or ruler).

The clamps are mounted in a tensile testing machine [e.g. Instron 5582, 3365 using a 1 kN load cell, or a machine of at least the equivalent functionality for testing tensile strength].

The crosshead speed of the tensile testing machine is a constant 100 mm/min throughout the test.

Any measurement with the sample breaking nearer to the clamp jaw than to the centre of the sample is rejected. FIG. 8 shows the sample before and after testing for a good test.

The maximum load during the test is recorded to allow strength to be calculated.

Tensile strength is given by the formula:

$$R(m) = \frac{F}{W \times t}$$

Where:
R(m)=Tensile Strength (kPa)
F=Maximum Parting Force (N)
W=Initial Width of the active part of the test piece (mm)
T=Initial Thickness of test piece (mm)

The test result is expressed as the mean of these tensile strength measurements together with the bulk density of the product.

Fibre Diameter

Fibre diameter can be measured in a variety of ways. A suitable method, used in determining the values presented herein comprises: —Sample dispersion Homogeneously dispersing a suitable quantity of fibre sample onto a 25 mm carbon tab (a carbon based electrically conductive adhesive disc, frequently referred to as a Leit tab) mounted on a 32 mm aluminium SEM stub. Dispersion is preferably by a dry method to reduce agglomeration. A convenient product to use is a Galai PD-10 powder disperser which uses a vacuum to such fibre into a chamber, from where it deposits onto the stub surface. By suitable quantity is meant sufficient to provide a uniform coating on the stub, but not a coating so dense as to make measurement problematic [e.g. 0.03 to 0.3 grams].

Sputter Coating

Coating the sample with a conductive material (e.g. metal or carbon).

Imaging

Using a scanning electron microscope (SEM) to take a number of images from regions of the sample [e.g. 50, 100, 200 or more images], the images comprising a number of fibres. Typically anywhere from 100 to 300 fibres would be measured. For the purpose of reproducibility, 300 fibres from at least 50 different images may be measured.

Image Analysis

For each image any fibre that is in focus, has an aspect ratio (length/diameter) of at least 3:1 and touches a reference line placed across the image, the diameter is measured by measurement from the SEM image.

This part may be semi-automated using image analysis software linked to the SEM. such as the Scandium® system available from Olympus Soft Imaging Solutions GmbH.

From the accumulated fibre measurements calculate the arithmetic mean diameter.

Because the diameter is measured only for fibres intercepting a line, and the probability of interception depends on fibre length, this method provide a length weighted arithmetic mean diameter.

Potential Uses

The fibres of, or produced by, the present invention can be used, subject to meeting relevant performance criteria, for any purpose for which fibrous inorganic materials, and particularly alkaline earth silicate and aluminosilicate materials, have been used heretofore; and may be used in future applications where the fibre properties are appropriate. In the following reference is made to a number of patent documents relating to applications in which the fibres may be used, subject to meeting relevant performance criteria for the application. The fibres of the present invention can be used in place of the fibres specified in any of these applications subject to meeting relevant performance criteria. The fibres may be used as made or in processed form [for example as chopped fibres] to meet the demands of the application concerned.

For example, the fibres may be used as: —
bulk materials;
in a mastic or mouldable composition [WO2013/080455, WO2013/080456] or as part of a wet article [WO2012/132271];
as a constituent in needled or otherwise entangled [WO2010/077360, WO2011/084487] assemblies of materials, for example in the form of blanket, folded blanket modules, or high density fibre blocks [WO2013/046052];
as a constituent of non-needled assemblies of materials, for example felts, vacuum formed shapes [WO2012/132469], or papers [WO2008/136875, WO2011/040968, WO2012/132329, WO2012/132327];
as a constituent (with fillers and/or binders) of boards, blocks, and more complex shapes [WO2007/143067, WO2012/049858, WO2011/083695, WO2011/083696];
as strengthening constituents in composite materials such as, for example, fibre reinforced cements, fibre reinforced plastics, and as a component of metal matrix composites;
in support structures for catalyst bodies in pollution control devices such as automotive exhaust system catalytic converters and diesel particulate filters [WO2013/015083], including support structures comprising:
  edge protectants [WO2010/024920, WO2012/021270];
  microporous materials [WO2009/032147, WO2011019394, WO2011/019396];
  organic binders and antioxidants [WO2009/032191];
  intumescent material [WO2009/032191];
  nanofibrillated fibres [WO2012/021817];
  microspheres [WO2011/084558];
  colloidal materials [WO2006/004974, WO2011/037617]
  oriented fibre layers [WO2011/084475];
  portions having different basis weight [WO2011/019377];
  layers comprising different fibres [WO2012065052];
  coated fibres [WO2010122337];
  mats cut at specified angles [WO2011067598];
  [NB all of the above features may be used in applications other than support structures for catalytic bodies]
  in the form of an end cone [e.g. U.S. Pat. Nos. 6,726,884, 8,182,751]
as a constituent of catalyst bodies [WO2010/074711];
as a constituent of friction materials [e.g. for automotive brakes [JP56-16578]];
for fire protection [e.g. WO2011/060421, WO2011/060259, WO2012/068427, WO2012/148468, WO2012/148469, WO2013074968]; and optionally in combination with one or more intumescent materials, endothermic materials, or both intumescent and endothermic materials
as insulation, for example;
  as insulation for ethylene crackers [WO2009/126593], hydrogen reforming apparatus [U.S. Pat. No. 4,690,690];
  as insulation in furnaces for the heat treatment of metals including iron and steel [U.S. Pat. No. 4,504,957];
  as insulation in apparatus for ceramics manufacturing.

The fibres may also be used in combination with other materials. For example the fibres of the invention may be used in combination with polycrystalline (sol-gel) fibres [WO2012/065052] or with other biosoluble fibres [WO2011/037634].

Bodies comprising the fibres may also be used in combination with bodies formed of other materials. For example, in insulation applications, a layer of material according to the present invention [for example a blanket or board] may be secured to a layer of insulation having a lower maximum continuous use temperature [for example a blanket or board of alkaline earth silicate fibres] [WO2010/120380, WO2011133778]. Securing of the layers together may be by any known mechanism, for example blanket anchors secured within the blankets [U.S. Pat. No. 4,578,918], or ceramic screws passing through the blankets [see for example DE3427918-A1].

The unique control of shot content and fibre diameter provided by the method and apparatus disclosed provides fibre masses that with little or no need for post-formation deshotting, enable products to be made with lower thermal conductivity than current comparable products on the market.

The following are representative embodiments according to the invention:

CLAUSES

1. Apparatus for forming melt-formed fibres comprising: —
  a source of molten material;
  a spinning head comprising one or more rotors each having an axis of rotation, at least one rotor being configured to receive molten material from the source of molten material at a region of the rotor to which melt is delivered;
  a plurality of nozzles or slots disposed around at least part of the one or more rotors, configured to supply a stream of gas;
  a conveyor disposed to receive fibres produced from the molten material; and
  a barrier between the spinning head and the conveyor, an upper edge of the barrier lying below a horizontal line lying in a first vertical plane including the axis of rotation of at least one rotor of the one or more rotors and intersecting the intersection of the axis of rotation with a second vertical plane orthogonal to the first vertical plane and including a vertical line through said region, the included angle θ between the horizontal line and a line in the first vertical plane joining the upper edge of the barrier and the intersection of the horizontal line and axis of rotation being in the range 40°-85°,
  the spinning head, barrier, and conveyor being disposed to permit fibres carried by the stream of gas to pass over the upper edge of the barrier to the conveyor.
2. Apparatus, according to Clause 1, in which the angle θ is greater than 50°.
3. Apparatus, according to Clause 2, in which the angle θ is greater than 60°.
4. Apparatus, according to Clause 3, in which the angle θ is greater than 70°.
5. Apparatus, according to any of Clauses 1 to 4, in which the angle θ is less than 80°.
6. Apparatus, any of Clauses 1 to 5, in which barrier is movable to adjust the angle θ.
7. Apparatus, according to any of Clauses 1 to 6, where the vertical line passes through the centroid of said region.

8. Apparatus, according to any of Clauses 1 to 6, where the vertical line extends from the centroid of a melt delivering orifice in the source of molten metal.
9. Apparatus, according to any of Clauses 1 to 5 in which at least one of the one or more rotors has an acceleration at its periphery in excess of 200 km·s$^{-2}$, and preferably in excess of 250 km·s$^{-2}$.
10. Apparatus, according to any of Clauses 1 to 9, in which the nozzles or slots are configured to deliver gas at a velocity in excess of 40 m·s$^{-1}$.
11. Apparatus, according to Clause 10, in which the nozzles or slots are configured to deliver gas at a velocity in excess of 80 m·s$^{-1}$.
12. A method for forming melt-formed fibres comprising the use of apparatus according to any of Clauses 1 to 11 by: —
    impinging a stream of molten material on one or more of the rotors;
    while passing a stream of gas from the nozzles or slots over at least one of the one or more rotors;
    such that fibres produced from the melt are carried by the stream of gas from the rotors and pass over the upper edge of the barrier to the conveyor;
    material not passing over the upper edge being rejected.
13. A method for forming melt-formed fibres according to Clause 12, in which the gas velocity at a distance of 50 mm from the nozzles or slots is in excess of 50 m·s$^{-1}$.
14. A method for forming melt-formed fibres according to Clause 12 or Clause 13, in which the stream of molten material is of a composition such that the fibres produced from the melt are aluminosilicate fibres.
15. A method for forming melt-formed fibres according to Clause 12 or Clause 13, in which the stream of molten material is of a composition such that the fibres produced from the melt are alkaline earth silicate fibres.
16. A method for forming melt-formed fibres according to Clause 15, in which the fibres comprise in weight percent: —

| | |
|---|---|
| $SiO_2$ | 45%-85% |
| alkaline earth oxide | 15%-55% |
| components other than alkaline earth oxides and silicon dioxide | 0 to 20% |

17. A method for forming melt-formed fibres according to Clause 16, in which the fibres comprise in weight percent:
    $SiO_2$: 70-80%
    CaO+MgO: 18-25%
    Other: <3%.
18. A method for forming melt-formed fibres according to Clause 15, in which the stream of molten material is of a composition such that the fibres produced from the melt comprise at least 1% by weight each of calcium oxide and magnesium oxide, and optionally comprise up to 20% by weight of components other than calcium oxide, magnesium oxide and silicon dioxide.
19. A method for forming melt-formed fibres according to Clause 18, in which the fibres comprise in weight percent: —
    $SiO_2$: 62-68%
    CaO: 26-32%
    MgO: 3-7%
    Others: <1%.
20. A method for forming melt-formed fibres according to Clause 15, in which the stream of molten material is of a composition such that the fibres produced from the melt are magnesium silicate fibres comprising less than 1% by weight of calcium oxide, at least 1% magnesium oxide, and optionally comprise up to 20% by weight of components other than calcium oxide, magnesium oxide and silicon dioxide.
21. A method for forming melt-formed fibres according to Clause 20, in which the fibres comprise in weight percent:

| | |
|---|---|
| $SiO_2$ | 65-86% |
| MgO | 14-35% | components other than MgO or $SiO_2$ 0-20%.
22. A method for forming melt-formed fibres according to Clause 15, in which the stream of molten material is of a composition such that the fibres produced from the melt comprise at least 1% by weight of calcium oxide, less than 1% magnesium oxide, and optionally comprise up to 20% by weight of components other than calcium oxide, magnesium oxide and silicon dioxide.
23. A method for forming melt-formed fibres according to Clause 22, in which the fibres comprise in weight percent:

| | |
|---|---|
| $SiO_2$ | 72-74.5% |
| CaO | 22.2-26% |
| MgO | 0.4-0.8% |
| $Al_2O_3$ | 0.9-1.4% |
| $K_2O$ | 0.5-0.8%. |

24. A method for forming melt-formed fibres according to Clause 12 or Clause 13, in which the stream of molten material is of a composition such that the fibres produced from the melt are alkali metal aluminosilicate fibres.
25. A method for forming melt-formed fibres according to Clause 24, in which the fibres comprise in mole percent:

| | |
|---|---|
| $Al_2O_3$ | 5-90 mol % |
| $K_2O$ | 12-40 mol % |
| $SiO_2$ | 5-80 mol % | in which $SiO_2+Al_2O_3+K_2O>=80$ mol %.
26. A method for forming melt-formed fibres according to Clause 25, in which the fibres comprise in weight percent:
    $Al_2O_3$ 36±1.5 wt %
    $K_2O$ 25.5±1.5 wt %
    $SiO_2$ 31±1.5 wt %
    $ZrO_2$ 6.5±0.5 wt %
    MgO 1±0.2 wt %
    with the total of these components being 99%-100% by weight.
27. A mass of melt-formed biosoluble fibres having an overall composition in weight percent
    $SiO_2$: 62-68%
    CaO: 26-32%
    MgO: 3-7%
    Others: <1%
    the fibres having a length weighted arithmetic mean diameter <2 μm and comprising fibres of a length greater than 10 cm, the mass having a shot content of shot >45 μm of less than 35 wt %, and capable of being formed by entanglement into a blanket having: —
    a density of 128 kg·m$^{-3}$;
    a thickness of 25 mm;
    a content of shot >45 μm of less than 35 wt %;
    a tensile strength >50 kPa.

28. A mass of melt-formed biosoluble fibres according to Clause 27 in which the mass has an overall composition

| | |
|---|---|
| $SiO_2$ | 64-66% |
| CaO | 27-31% |
| MgO | 4-7% |
| $Al_2O_3$ | <0.8%. |

29. A mass of melt-formed biosoluble fibres having an overall composition in weight percent
$SiO_2$: 70-80%
CaO+MgO: 18-25%
Other: <3%
the fibres having a length weighted arithmetic mean diameter <2 μm and comprising fibres of a length greater than 10 cm, the mass having a shot content of shot >45 μm of less than 35 wt %, and capable of being formed by entanglement into a blanket having: —
a density of 128 kg·m$^{-3}$;
a thickness of 25 mm;
a content of shot >45 μm of less than 35 wt %;
a tensile strength >50 kPa.
and is formable by entanglement into a blanket having a thermal conductivity at 1000° C. of 0.26 W·m$^{-1}$·K$^{-1}$.

30. A mass of melt-formed biosoluble fibres as according to Clause 29 in which the mass has an overall composition in weight percent

| | |
|---|---|
| $SiO_2$ | 73-74.5% |
| CaO | 22.2-26% |
| MgO | 0.4-0.8% |
| $Al_2O_3$ | 0.9-1.4% |
| $K_2O$ | 0.5-0.8%. |

31. A blanket of melt-formed biosoluble fibres formed from a mass of melt-formed biosoluble fibre according to any of Clauses 27 to 30, or as produced by the method of any of clauses 12 to 26.

32. A blanket according to Clause 31 having a density in the range 58 to 182 kg·m$^{-3}$ in which the blankets have a tensile strength to density ratio of >0.39 kPa/kg·m$^{-3}$.

The above disclosure is by way of example and the person skilled in the art will readily be able to find a multiplicity of uses for the fibres produced on the disclosed apparatus or by the disclosed methods.

The invention claimed is:

1. A mass of melt-formed biosoluble fibres having an overall composition in weight percent of:
$SiO_2$: 62-68%;
CaO: 26-32%;
MgO: 3-7%; and
Others: less than 1%,
the melt-formed biosoluble fibres having a length weighted arithmetic mean diameter less than 2 μm and comprising fibres of a length greater than 10 cm, the mass having a shot content of shot having a dimension greater than 45 μm of less than 35 wt %, and capable of being formed by entanglement into a blanket having:
a density of 128 kg·m$^{-3}$;
a thickness of 25 mm; and
a tensile strength greater than 50 kPa from a blanket sample of 230±5 mm×75±2 mm and clamped at each end with an unclamped span of 150±5 mm, wherein the mass of melt-formed biosoluble fibers is a non-deshotted mass of melt-formed biosoluble fibers having a mass of more than 100 grams.

2. The mass of melt-formed biosoluble fibers of claim 1, the mass having the shot content of shot having a dimension greater than 45 μm of greater than 28 wt %.

3. The mass of melt-formed biosoluble fibers of claim 1, wherein the length of the melt-formed biosoluble fibres is greater than 20 cm.

4. The mass of melt-formed biosoluble fibers of claim 1, wherein the length of the melt-formed biosoluble fibres is greater than 30 cm.

5. A mass of melt-formed biosoluble fibres having an overall composition in weight percent of:
$SiO_2$: 70-80%;
CaO+MgO: 18-25%; and
Other: less than 3%
the melt-formed biosoluble fibres having a length weighted arithmetic mean diameter less than 2 μm and comprising fibres of a length greater than 10 cm, the mass having a shot content of shot having a dimension greater than 45 μm of less than 35 wt %, and capable of being formed by entanglement into a blanket having:
a density of 128 kg·m$^{-3}$;
a thickness of 25 mm;
a tensile strength greater than 50 kPa from a blanket sample of 230±5 mm×75±2 mm and clamped at each end with an unclamped span of 150±5 mm; and
having a thermal conductivity at 1000° C. of less than or equal to 0.26 W·m$^{-1}$·K$^{-1}$,
wherein the mass of melt-formed biosoluble fibers is a non-deshotted mass of melt-formed biosoluble fibers having a mass of more than 100 grams.

6. The mass of melt-formed biosoluble fibers of claim 5, the mass having the shot content of shot having a dimension greater than 45 μm of greater than or equal to 33.24 wt %.

7. The mass of melt-formed biosoluble fibers of claim 5, wherein the length of the melt-formed biosoluble fibres is greater than 20 cm.

8. The mass of melt-formed biosoluble fibers of claim 5, wherein the length of the melt-formed biosoluble fibres is greater than 30 cm.

9. A mass of melt-formed biosoluble fibres having an overall composition in weight percent of:

| | |
|---|---|
| $SiO_2$ | 73-74.5%; |
| CaO | 22.2-26%; |
| MgO | 0.4-0.8%; |
| $Al_2O_3$ | 0.9-1.4%; and |
| $K_2O$ | 0.5-0.8%, | the melt-formed biosoluble fibres having a length weighted arithmetic mean diameter less than 2 μm and comprising fibres of a length greater than 10 cm, the mass having a shot content of shot having a dimension greater than 45 μm of less than 35 wt %, and capable of being formed by entanglement into a blanket having:
a density of 128 kg·m$^{-3}$;
a thickness of 25 mm;
a tensile strength greater than 50 kPa from a blanket sample of 230±5 mm×75±2 mm and clamped at each end with an unclamped span of 150±5 mm; and
having a thermal conductivity at 1000° C. of less than or equal to 0.26 W·m$^{-1}$·K$^{-1}$,
wherein the mass of melt-formed biosoluble fibers is a non-deshotted mass of melt-formed biosoluble fibers having a mass of more than 100 grams.

10. The mass of melt-formed biosoluble fibers of claim 9, wherein the length of the melt-formed biosoluble fibres is greater than 20 cm.

11. The mass of melt-formed biosoluble fibers of claim 9, wherein the length of the melt-formed biosoluble fibres is greater than 30 cm.

12. A blanket of melt-formed biosoluble fibres formed by entanglement of the mass of melt-formed biosoluble fibre as claimed in claim 1.

13. The blanket of claim 12 having a density in the range 58 to 182 kg·m$^{-3}$ and having a tensile strength to density ratio of greater than 0.39 kPa/(kg·m$^{-3}$).

* * * * *